(12) United States Patent
Cheung et al.

(10) Patent No.: US 11,687,325 B2
(45) Date of Patent: *Jun. 27, 2023

(54) METHOD FOR CONSTRUCTING AN INTERACTIVE DIGITAL CATALOG, AND COMPUTER-READABLE STORAGE MEDIUM AND INTERACTIVE DIGITAL CATALOG USING THE SAME

(71) Applicant: ABLE WORLD INTERNATIONAL LIMITED, Tortola (VG)

(72) Inventors: Wai-Tung Cheung, Hong Kong (HK); Chun-Hsiao Lin, New Taipei (TW); Ho-Cheung Cheung, Hong Kong (HK)

(73) Assignee: ABLE WORLD INTERNATIONAL LIMITED, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,178

(22) Filed: May 9, 2022

(65) Prior Publication Data
US 2022/0261225 A1 Aug. 18, 2022

Related U.S. Application Data

(63) Continuation of application No. 15/535,181, filed as application No. PCT/CN2015/097137 on Dec. 11, (Continued)

(30) Foreign Application Priority Data

Dec. 12, 2014 (CN) .......................... 201410768564.X
Dec. 18, 2014 (CN) .......................... 201410796528.4
Dec. 23, 2014 (CN) .......................... 201410814138.5

(51) Int. Cl.
*G06F 8/34* (2018.01)
*G06F 8/20* (2018.01)
(Continued)

(52) U.S. Cl.
CPC .................. *G06F 8/34* (2013.01); *G06F 8/20* (2013.01); *G06F 8/35* (2013.01); *G06F 8/38* (2013.01);
(Continued)

(58) Field of Classification Search
None
See application file for complete search history.

(56) References Cited

U.S. PATENT DOCUMENTS

| 6,437,803 B1 * | 8/2002 | Panasyuk ................ G06F 9/542 715/750 |
| 2005/0120349 A1 * | 6/2005 | Wright .................... G06F 3/038 718/107 |

(Continued)

OTHER PUBLICATIONS

International search report issued in International Patent Application No. PCT/CN2015/097137, dated Mar. 14, 2016.
(Continued)

*Primary Examiner* — Qing Chen

(57) ABSTRACT

A method for constructing an interactive digital catalog, a computer-readable storage medium and an interactive digital catalog using the method are provided. The method includes the following steps. Firstly, the interactive digital catalog including at least one page is provided. Then, the at least one operable unified matter is presented and/or managed by laying out the at least one operable unified matter on the at least one page according to a predefined rule. The computer-readable storage medium has a computing program for executing the above method. The interactive digital catalog is constructed by the above method.

36 Claims, 19 Drawing Sheets

Related U.S. Application Data 2015, now Pat. No. 11,360,746, which is a continuation of application No. 14/577,772, filed on Dec. 19, 2014, now Pat. No. 9,626,157, which is a continuation-in-part of application No. 14/324,069, filed on Jul. 3, 2014, now Pat. No. 9,134,963.

(51) Int. Cl.
*G06F 21/31* (2013.01)
*G06F 40/106* (2020.01)
*G06F 8/35* (2018.01)
*G06F 8/38* (2018.01)
*H04L 9/40* (2022.01)

(52) U.S. Cl.
CPC ............ *G06F 21/31* (2013.01); *G06F 40/106* (2020.01); *H04L 63/102* (2013.01)

(56) References Cited

U.S. PATENT DOCUMENTS

| | | | | |
|---|---|---|---|---|
| 2005/0151835 A1* | 7/2005 | Guo | ................ | G06F 3/1454 348/14.07 |
| 2007/0055941 A1* | 3/2007 | Bhakta | ................ | G06F 3/1454 715/739 |
| 2007/0124374 A1* | 5/2007 | Arun | ................ | G06Q 10/10 709/204 |
| 2009/0006553 A1* | 1/2009 | Grandhi | ................ | G06F 16/1873 709/205 |
| 2010/0313199 A1* | 12/2010 | Chen | ................ | H04L 67/01 717/177 |
| 2011/0197147 A1* | 8/2011 | Fai | ................ | G06F 3/0425 715/753 |
| 2012/0054640 A1* | 3/2012 | Nancke-Krogh | ..... | G06F 9/4843 715/751 |
| 2012/0060204 A1* | 3/2012 | Panasyuk | ................ | G06F 21/604 726/3 |
| 2012/0151373 A1* | 6/2012 | Kominac | ................ | H04L 67/141 715/740 |
| 2013/0246901 A1* | 9/2013 | Massand | ................ | G06F 40/197 715/229 |
| 2014/0020079 A1* | 1/2014 | Lu | ................ | H04L 63/0815 726/8 |
| 2014/0101137 A1 | 4/2014 | Satyanarayanan | | |
| 2016/0070366 A1* | 3/2016 | Pinheiro De Figueiredo | ............ | G06F 3/0346 345/156 |

OTHER PUBLICATIONS

International preliminary report on patentability issued in International Patent Application No. PCT/CN2015/097137, dated Jun. 13, 2017.

* cited by examiner

METHOD FOR CONSTRUCTING AN INTERACTIVE DIGITAL CATALOG, AND COMPUTER-READABLE STORAGE MEDIUM AND INTERACTIVE DIGITAL CATALOG USING THE SAME

TECHNICAL FIELD

The present invention relates to a method for constructing an interactive digital catalog, and more particularly to a method for constructing an interactive digital catalog and a computer-readable storage medium and an interactive digital catalog using the method.

BACKGROUND

The basic purpose of a catalog is to organize the combination of products, services or data of interest to individuals or groups as explicit and abstract information in a standardized format. Generally, catalogs can be delivered in many forms. For example, catalogs can be printed in a paper medium or displayed on a display screen or a computer monitor. Catalogs are usually structured lists or itemized displays of titles, course offerings or articles. Moreover, catalogs often include descriptive information or graphic presentation associated with the listed items so as to be used for exhibition or sale. Catalogs in their traditional forms include mail order catalogs, retail catalogs, discount catalogs, supplier catalogs, service catalogs, bulletins, flyers, posters, etc. Catalogs in their more modern forms can increase the information of products from a single data field to the content of several hundred pages. Alternatively, catalogs in their more modern forms can present the key features of articles or selling information to consumers in a direct or subliminal manner through televisions or commercial radios so as to facilitate accumulating the buyers.

As known, the cost of producing print advertisements is very high. For delivering information, the retailer or vendor has to invest a lot of money in design, production, publication and distribution to provide the consumer with catalogs, brochures, magazines, flyers, billboards. In addition to the above cost invested by the retailer or vendor, the freight cost is possibly transferred to the consumers. Under this circumstance, the conflict between the retailer or vendor and the consumer occur.

The advent of the internet has created new medium information for providing digital catalogs such as web banners, e-mail offerings, search engines, electronic handbooks, electronic catalogs or online periodicals. Catalogs can also be thought of as any information services. For example, in the media publishing industry, catalogs include magazines and books. Other examples of catalogs include movies, television shows, documentaries, music, radio programs and any other entertainment products. The purposes of the above entertainment products are consistent with the purposes of catalogs. That is, catalogs are used to organize key data about products, services or information in a structured manner in order to help or facilitate the users to implement commerce transactions or acquire requisite information.

Nowadays, many people use or browse some kinds of catalogs on a daily basis because the human mind is subliminally and constantly cataloging. Through the internet, the catalog has been transformed from a largely printed medium to a digital one, allowing users to access the cataloged information whenever or wherever the users have an internet connection. Moreover, it is more efficient to edit the catalogs of products and services through the internet. That is, the internet provides a means of coordinating the interaction between the vendor or provider and the user in order to facilitate the personalized commercial transactions. When compared with the interactive environment between the conventional retail stores, the use of the internet can significantly reduce the time and effort required for selection and purchase. The combination of digital publishing and the internet will accelerate the process of making policy, or even cause an unpredictable dynamic change on the buying models or habits of the consumers. Consequently, the combination of digital publishing and the internet combination of digital publishing and the internet is more outstanding to the industry supply chain.

The digital publishing purpose can be achieved through websites and electronic mails. Consequently, the sales catalogs in e-commerce become very popular, and many vendors have significant success through the internet. In other words, the method of editing catalogs is largely broadened with the development of computing technologies. Consequently, the online catalogs play very important role in e-commerce.

Moreover, the vast amount of information available on the websites overloads the consumer, and this reflects the inherent problem of information broadcasting. Due to the limitations of the current technology, the user cannot efficiently achieve a large amount of useful information through the website. Consequently, an effective catalog has to be transferred to proper or specific users (i.e., the users interested in the associated information of products or services). Moreover, the effective catalog must have the function of personalized interaction. That is, the effective catalog must be simple and customized to suit the needs of the users effectively. Consequently, it is an important issue to allow the printed information to comply with the catalog format and allow the catalog to be placed in a proper location and suitably used through network services.

Most catalog descriptions consist of the common attributes of the product, material or service. This is adequate for speed searching, but is not guaranteed to make a match. Moreover, due to the serve limitation of product differences, the supplier cannot show why its product is the right fit or the best buy. In addition, catalog data are often homogenized into the database to fit a limited format. For avoiding the restrictions, a highly dynamic, personalized and user-oriented cataloging system is needed. Consequently, the features of the products can be efficiently highlighted to meet the taste and lifestyles of different users.

Moreover, since the conventional search engine is usually not very powerful, the conventional search engine cannot efficiently search out the scattered information from different information sources through the networks. If the scattered information can be effectively searched out and classified and a highly-expandable automated solution is provided, it is helpful to create an electronic digital catalog with plural data from different information sources.

Although paper-based publications and broadcast media are still prevalent, more and more consumers access newspapers, magazines, and televisions through their computers or networks. Moreover, the internet has revolutionized the publishing industry because the delivering information via the internet represents a significant leap in efficiency over the conventional distribution methods. However, since online information is not consistently or effectively packaged, the uncertainty in information format and classification occurs. Therefore, it is important for the user to use a consistent and convenient method to acquire the required information.

Web services are interoperable web-based software services that can be subscribed to users on a payment or free-use basis. The term "interoperability" means that a user of a user terminal can operate a web service to access another web service. Through the web service, plural application programs or systematic structures from any platforms can be combined together to provide entire services to consumers or users.

If the catalog is very large and has many options, it is time-consuming for the users to browse the entire of the catalog. Regardless of what the information format of the catalog is, the catalog is not fully utilized. Moreover, the catalog contains a large amount of free floating information. If the information is properly captured and utilized, the transactions between vendors and consumers become smarter and more flexible.

Some eBook companies such as Kotobee Publisher provide authoring software for allowing users to create multi-platform interactive electronic books that are enriched with useful tools. Moreover, the created electronic books can run on multiple platforms. For example, the created electronic books can be exported as a native application program to the Android or iOS system, or converted into a web application program or a desktop application program. Moreover, the content of the electronic book can be designed from Scratch or imported from a PDF file. As the content of the electronic book is increased, the electronic book can be equipped with multipurpose tools that allow the application programs of the electronic book to be the true research tools. For example, the reading user can visually takes notes and store them in a database. However, these electronic books can only be formatted as the format of the Android or iOS system. In other words, these electronic books cannot meet the requirements of cross-platforms.

A Scratch interactive program is a multimedia authoring tool for a range of educational and entertainment constructivist purposes from math or science projects. Through the Scratch interactive program, students, scholars, teachers or parents can present recording lectures with animated presentations, make simulations and visualizations of experiments, and present animated stories of social sciences, interactive art and music. Moreover, simple games can be made with the Scratch interactive program. The user can view the existing projects available on the Scratch website or modify and test the projects without online registration. Moreover, Scratch allows users to use event-driven programming with multiple active objects. These objects can be drawn as either vectors or bitmap graphics through a simple editor that is part of the Scratch, or these objects can be imported from external sources including webcams. However, the Scratch interactive program also needs to face the cross-platform requirements.

Moreover, according to the current technology of a digital catalog, the electronic book is a representative catalog product of the digital catalog. However, the digital catalog lacks interactivity. Since the content of the digital catalog is not operable, there is no interaction between the digital catalog and the observer. Moreover, the sources of the digital catalog cannot be self-expanded. On the other hand, since the types or forms of the digital catalogs are set by vendors, the contents of the conventional digital catalogs are passively accepted by people or users and allowed to be adjusted with limitations and restriction Although the multimedia product edited in the Scratch interactive program maybe have interactivity and operability, the contents are not unified. Since the associated contents and tools of the Scratch interactive program are provided by vendors, the content sources of the Scratch interactive program cannot be self-expanded. Moreover, the web page is suitable for producing the digital catalog.

From the above discussions, the conventional interactive digital catalog and the conventional method for constructing the interactive digital catalog need to be further improved.

SUMMARY

An object of the prevent invention provides a method for constructing an interactive digital catalog and a computer-readable storage medium and an interactive digital catalog using the method. The interactive digital catalog provides high flexibility of allowing the users to acquire and lay out the required unified matter on the interactive digital catalog without limitations or restrictions. Moreover, since the sources of the unified matters are continuously expandable, the use of the interactive digital catalog can implement specified tasks. Moreover, the user can share or publish the interactive digital catalog to other users or social websites in a wired or wireless transmission manner.

In accordance with an aspect of the present invention, there is provided a method for constructing an interactive digital catalog to present and/or manage at least one operable unified matter. The method includes the following steps. Firstly, the interactive digital catalog is created, wherein the interactive digital catalog includes at least one page. Then, the at least one operable unified matter is presented and/or managed by laying out the at least one operable unified matter on the at least one page according to a predefined rule.

In an embodiment, the at least one operable unified matter includes at least one unified information unit and/or at least one unified tool.

In an embodiment, the at least one unified information unit is produced by unifying the at least one original information obtained from at least one information source is unified, and/or the at least one unified tool is produced by unifying the at least one original tool obtained from at least one information source is unified.

In an embodiment, the at least one unified tool is used for presenting dynamic information, collecting information, manipulating the at least one unified information unit and/or proceeding transactions.

In an embodiment, a unified matter source of the at least one operable unified matter is expandable.

In an embodiment, the at least one operable unified matter is presented with an icon, a text, an input term or any combination thereof.

In an embodiment, the input term is a single input item, a multiple input item, a text input term or an event input term.

In an embodiment, the interactive digital catalog is presented with the appearance of a book, and the at least one page includes at least one cover page, at least one index page and/or at least one content page.

In an embodiment, the at least one index page has at least one bookmark, wherein the at least one content page is opened through the at least one bookmark.

In an embodiment, the at least one content page is grouped into at least one section.

In an embodiment, the at least one index page has at least one bookmark, wherein the at least one section is opened through the at least one bookmark.

In an embodiment, the at least one cover page, the at least one index page and the at least one content page of the interactive digital catalog are sequentially arranged in order.

In an embodiment, the at least one index page contains the at least one cover page.

In an embodiment, the interactive digital catalog is presented in a three-dimensional space so as to be browsed.

In an embodiment, the at least one page comprises plural pages, wherein the plural pages are arranged along a Z-axis direction and partially overlapped with each other.

In an embodiment, the predefined rule is used to scale the at least one operable unified matter, move the at least one operable unified matter and/or apply a template to the at least one operable unified matter so as to change layout.

In an embodiment, the method further includes steps of providing a catalog launcher to launch the interactive digital catalog, and providing at least one application programming interface to the interactive digital catalog. The application programming interface allows a first one of the at least one operable unified matter to manage and/or operate a second one of the at least one operable unified matter, or allows the first one and the second one of the at least one operable unified matter to cooperate with each other.

In an embodiment, when the at least one operable unified matter is operated, at least one executable component connected with the at least one operable unified matter is inserted into the interactive digital catalog through the catalog launcher, so that a specified task is performed.

In an embodiment, the at least one executable component is built in or plugged in the interactive digital catalog.

In accordance with another aspect of the present invention, there is provided a computer-readable storage medium for constructing an interactive digital catalog to present and/or manage at least one operable unified matter. The computer-readable storage medium includes a computing program. While the computing program is executed, the computing program performs the following steps. Firstly, the interactive digital catalog is created, wherein the interactive digital catalog includes at least one page. Then, the at least one operable unified matter is presented and/or managed by laying out the at least one operable unified matter on the at least one page according to a predefined rule.

In an embodiment, while the computing program is executed, the computing program further performs steps of providing a catalog launcher to launch the interactive digital catalog and providing at least one application programming interface to the interactive digital catalog. The application programming interface allows a first one of the at least one operable unified matter to manage and/or operate a second one of the at least one operable unified matter, or allows the first one and the second one of the at least one operable unified matter to cooperate with each other.

In an embodiment, when the at least one operable unified matter is operated, at least one executable component connected with the at least one operable unified matter is inserted into the interactive digital catalog through the catalog launcher, so that a specified task is performed.

In accordance with another aspect of the present invention, there is provided an interactive digital catalog. The interactive digital catalog includes at least one page. The at least one page contains at least one operable unified matter. The at least one operable unified matter is laid out on the at least one page according to a predefined rule.

In an embodiment, the at least one operable unified matter includes at least one unified information unit and/or at least one unified tool.

In an embodiment, the at least one unified information unit is produced by unifying at least one original information obtained from at least one information source is unified, and/or the at least one unified tool is produced by unifying at least one original tool obtained from at least one information source is unified.

In an embodiment, the interactive digital catalog is presented with the appearance of a book, and the at least one page includes at least one cover page, at least one index page and/or at least one content page.

In an embodiment, the predefined rule is used to scale the at least one operable unified matter, move the at least one operable unified matter and/or apply a template to the at least one operable unified matter so as to change layout.

The above objects and advantages of the present invention will become more readily apparent to those ordinarily skilled in the art after reviewing the following detailed description and accompanying drawings, in which:

DETAILED DESCRIPTION

The present invention is more fully appreciated by reference to the following description, including the following glossary of terms and the concluding examples. For the sake of brevity, the disclosures of the publications, including patents, cited in this specification are herein incorporated by reference.

The examples below are non-limiting and are merely representative of various aspects and features of the present invention. The term "information source" used herein is defined as a sequence of symbols that can be interpreted as a message in the most limited technical meaning. And the message is used for organizing and labeling information. For example, the information source includes website (such as internet service), intranet, social network, software, electronic book, database and other media of information (such as storage media of non-transitory computer or storage media of mobile device). The term "original information" used herein is a file, a web page, a database row, a policy, a rule or any data accessible in a corresponding machine and server, but is not limited thereto. The term "original tool" used herein is a utility, a widget, an intelligent agent, an application, a service or any executable component accessible in a corresponding machine and server, but is not limited thereto. It is noted that the information sources, the original information and the original tool are not restricted to the above examples.

Moreover, "original information" and "original tool" are implementation examples of "original matters" used herein. In accordance with the present invention, a plurality of "original matters" from identical or different "information sources" are modeled to a plurality of "unified matters" by a unifying method. Consequently, the "unified matters" in the same execution environment are compatible with each other and cooperate to perform a specified task. The "unified tool" and the "unified information unit" are implementation examples of the "unified matters". Moreover, the term "Matterizer" used herein is a means, a device or a program code to perform the unifying process.

In an embodiment, the above unifying method comprises steps of: modeling at least one original information obtained from at least one information source of multiple information sources into a unified information unit with one unified data model via re-organizing the original information, and/or modeling at least one original tool obtained from at least one information source of multiple information sources into a unified tool with another unified data model via re-organizing the original tool. The one unified data model and another unified data model could be identical or different, and the unifying method described above could be completed through a matterizer.

Figure 1:
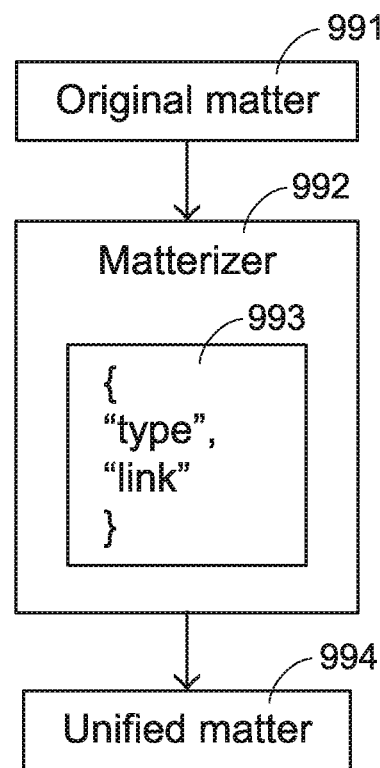
FIG. 1 is a schematic diagram illustrating an implementation concept of a unifying method according to an embodiment.

Please refer to FIG. 1. FIG. 1 is a schematic diagram illustrating an implementation concept of a unifying method according to an embodiment. As shown in FIG. 1, the matterizer 992 re-organizes an attribute and a link of an original matter 991 with a unified data model 993, and thus models the original matter 991 into a unified matter 994. Consequently, the basic attribute of the unified matter 994 include a type of the original matter 994 and a link indicating where the original matter 994 is located.

In this embodiment, the original matter 991 at least includes an original information (not shown) or an original tool (not shown), but is not limited thereto. In the above unifying method, if the attribute accessible from the original information corresponds to the attribute to be unified in the unified information unit, the unified information unit is directly produced through the matterizer 992. If the attribute accessible from the original information does not correspond to the attribute to be unified in the unified information unit, the original information is firstly re-defined by logically re-organizing the attributes and the link of the original information, and then the original information is converted into a new original information with the attributes which correspond to attributes to be unified in the unified information unit. Consequently, the unified information unit is indirectly produced.

Moreover, if the original tool is compatible with the working environment of the workspace, the unified tool is directly produced by the matterizer 992. On the other hand, if the original tool is incompatible with the working environment of the workspace, the unified tool is indirectly produced via an adapter and/or a software development kit (SDK) of the original tool to drive the original tool. The adapter provides an interface implementation compatible with the working environment.

Herein, "the descriptions of the unifying method", "the methods of obtaining the unified matters" and "the descriptions of the matterizer" may be referred to the U.S. patent application Ser. No. 14/324,069, entitled "A method of unifying information and tool from a plurality of information sources", and also referred to the China Patent Application No. 201410768564.X, entitled "A method of unifying information and tool from a plurality of information sources and computer product and device using the method". The detailed descriptions thereof are omitted.

The above unifying method is presented herein for purpose of illustration and description only. The method of unifying a plurality of original matters from different information sources is not restricted. However, those skilled in the art will readily observe that numerous modifications and alterations may be made while retaining the teachings of the invention.

Hereinafter, two other unifying methods will be illustrated. The first unifying method is applied to a method of unifying the information of Garmin satellite navigation. Through a point-of-interest (POI) function of the Garmin satellite navigation, the method of unifying the information is employed to unify the imported original point information (i.e., an original information) into the corresponding unified point information (i.e., a unified information unit). The second unifying method is applied to a method of unifying the tool of an Android system. The Android system is a Linux-based open source mobile operating system. However, most application programs (i.e., original tools) are written in the Java programming language. Consequently, the application program (i.e., the original tool) written in the Java programming language can be modelled into a unified application program (i.e., the unified tool) compatible with the Android system so as to be executed in the Android system.

The term "workspace" used herein is a working environment for providing interactions between the at least one matterizer, the at least one tool and/or the at least one information so as to implement a specified task. Moreover, the at least one tool and/or at least one information can be imported into the workspace through the at least one matterizer. However, the way of importing the information and/or tool into the workspace is not restricted. Hereinafter, information importers such as the information importers 9881, 9882 and 9883 of FIG. 2, the Dropbox importer 9761' of FIG. 6, the information importers 320 and 360 of FIG. 9 and the information importers 420 and 451 of FIG. 10 are some examples of the matterizer. The term "unified script" used herein is an intermediate language to implement the workspace. Moreover, via the "unified script", the at least one matterizer, the at least one tool and/or the at least one information can be provided to the workspace (e.g., built in or plugged in the workspace).

In an embodiment, the above at least one information is a unified information unit which is produced by unifying the at least one original information obtained from at least one information source is unified, and the above at least one tool is a unified tool which is produced by unifying the at least one original tool obtained from at least one information source is unified. Moreover, according to different tasks, the required unified information unit and/or the required unified tool from the corresponding information source can be added to the personal workspace (e.g., built in or plugged in the personal workspace). In other words, the "workspace" is a user-orientated "personal workspace".

Figure 2:
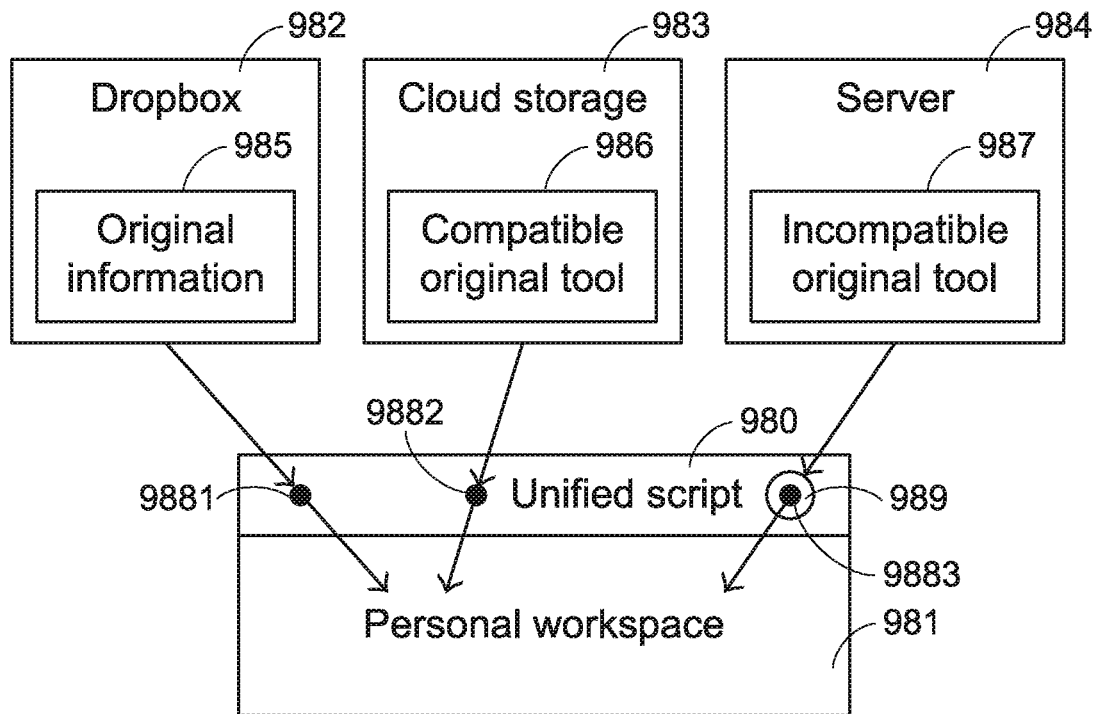
FIG. 2 is a schematic diagram illustrating an implementation concept of using the unified script as an intermediate language for implementing the personal workspace.
Figure 3:
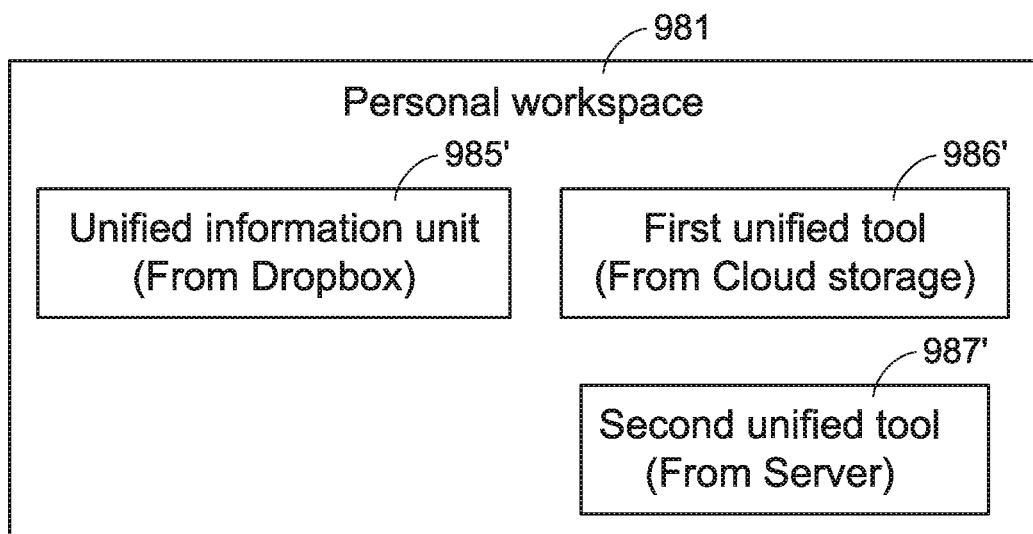
FIG. 3 is a schematic diagram illustrating a preferred configuration of a personal workspace.

Please refer to FIG. 2 and FIG. 3. FIG. 2 is a schematic diagram illustrating an implementation concept of using the unified script as an intermediate language for implementing the personal workspace. FIG. 3 is a schematic diagram illustrating a preferred configuration of a personal workspace. As shown in FIG. 2 and FIG. 3, a unified information unit 985' corresponding to an original information 985 in Dropbox 982, a first unified tool 986' corresponding to a compatible original tool 986 in a cloud storage 983 and a second unified tool 987' corresponding to an incompatible original tool 987 in a server 984 are combined together into a personal workspace 981 according to the required tasks. In particular, a unified script 980 as an intermediate language for implementing the personal workspace 981 is firstly compiled, and then an information importer 9881 of the Dropbox 982, an information importer 9882 of the cloud storage 983 and an information importer 9883 of the server 984 are configured through the unified script 980. Moreover, after the original information 985 in the Dropbox 982 is unified into the unified information unit 985' by the information importer 9881, the unified information unit 985' is imported into the personal workspace 981.

As shown in FIG. 2 and FIG. 3, the original tool stored in the cloud storage 983 is the compatible original tool 986, which is compatible with the component architecture of the unified tool in the personal workspace 981. Moreover, the first unified tool 986' corresponding to the compatible original tool 986 is directly provided to the personal workspace 981 through the information importer 9882 of the unified script 980.

As shown in FIG. 2 and FIG. 3, the original tool stored in the server 984 is the incompatible original tool 987, which is incompatible with the component architecture of the unified tool in the personal workspace 981. Moreover, the second unified tool 987' corresponding to the incompatible original tool 987 is provided to the personal workspace 981 through the compatible adapter 989 and the information importer 9883 of the unified script 980.

As shown in FIG. 3, the user can configure and arrange (e.g., group or place) the unified information unit 985', the first unified tool 986' and the second unified tool 987' in a specific area of the personal workspace 981 according to the practical requirements. Moreover, according to the operational relationship between the unified tool and the unified information unit (e.g., the clicking or dragging actions between the two), the user can perform specified tasks by using the unified tool to access or control the corresponding unified information unit.

Herein, "the descriptions of using the unified script as the intermediate language for implementing the personal workspace" and "the descriptions of allowing the required unified information unit and/or the required unified tool from the corresponding information sources to be arbitrarily combined together into the personal workspace according to the practical requirements" may be referred to the U.S. patent application Ser. No. 14/325,466, entitled "Method for performing task on unified information units in a personal workspace", and also referred to the China Patent Application No. 201410796528.4, entitled "A method of combining unified matters in a personal workspace and computer product and device using the method". The detailed descriptions thereof are omitted.

The above personal workspace is presented herein for purpose of illustration and description only. It is noted that the workspace used in the present invention is not restricted. For example, the unified script as the intermediate language for implementing the workspace can be previously edited. Consequently, the workspace equips the default matterizer, the default information and/or the default tool. This workspace is not limited to be operated by a single user. According to the practical requirements, this workspace can be operated by multiple users at the same time or at different times.

Moreover, the "workspace" used herein is obtained by "a method of projecting a workspace" to any electronic device with computational capability. An example of the electronic device includes but is not limited to a mobile phone, a tablet computer, a notebook computer or a desktop computer. Consequently, the "projected workspace" can be operated by any user through any electronic device with computational capability.

In an embodiment, the method of projecting the workspace comprises the following steps. Firstly, a projectable space instance instantiated by the unified script is obtained through a uniform resource identifier (URI). As mentioned above, the unified script is defined to configure at least one of the matterizer, the information and the tool to model the workspace. Moreover, the projectable space instance is used to build the projected workspace corresponding to the workspace, and thus provide an interface for operating at least one of the matterizer, the information and the tool to implement a task. Then, a projector parses the projectable space instance and build a working environment to configure at least one of the matterizer, the information and the tool so as to execute the projected workspace for providing interactions between at least one user and the projected workspace.

The projector is acquired from a remote data station, the projectable space instance or a preloaded application program, and loaded into an engine for providing a compatible environment to execute the projector. An example of the engine includes but is not limited to a Javascript engine (e.g., a browser), a Windows application or a Linux application. Preferably but not exclusively, the unified script can be declared by a document type definition (DTD), an extensible markup language (XML) Schema, a structured language or a structured protocol. Preferably but not exclusively, the projectable space instance is an object, an extensible markup language (XML) document, or an instance instantiated with a structured language or a structured protocol.

Figure 4:
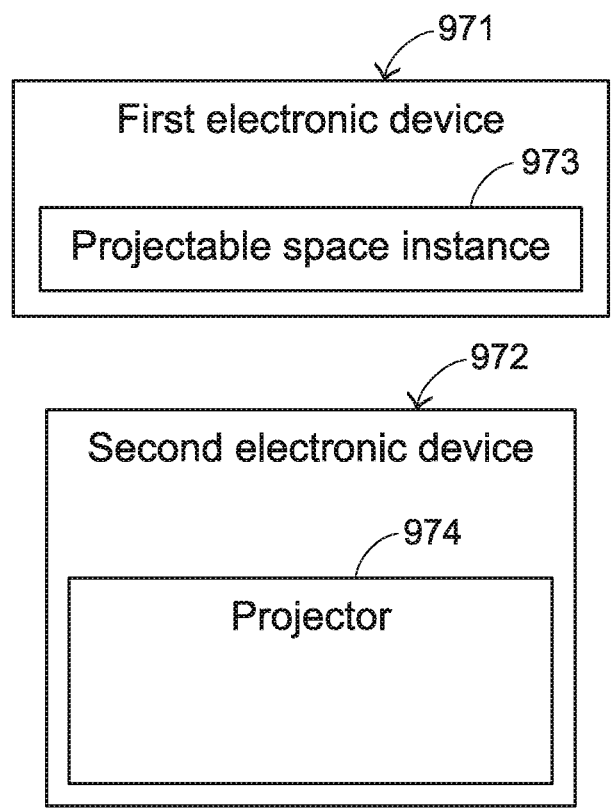
FIG. 4 is a schematic diagram illustrating an initial state of the method of projecting the workspace according to an embodiment of the present invention.
Figure 5A:
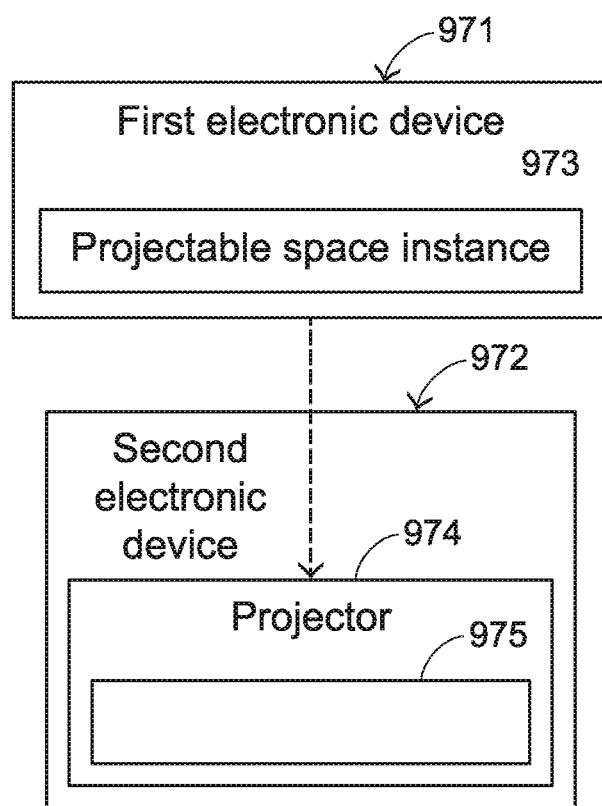
FIGS. 5A and 5B are schematic diagrams illustrating operating concepts of the method of projecting the workspace as shown in FIG. 4.
Figure 5B:
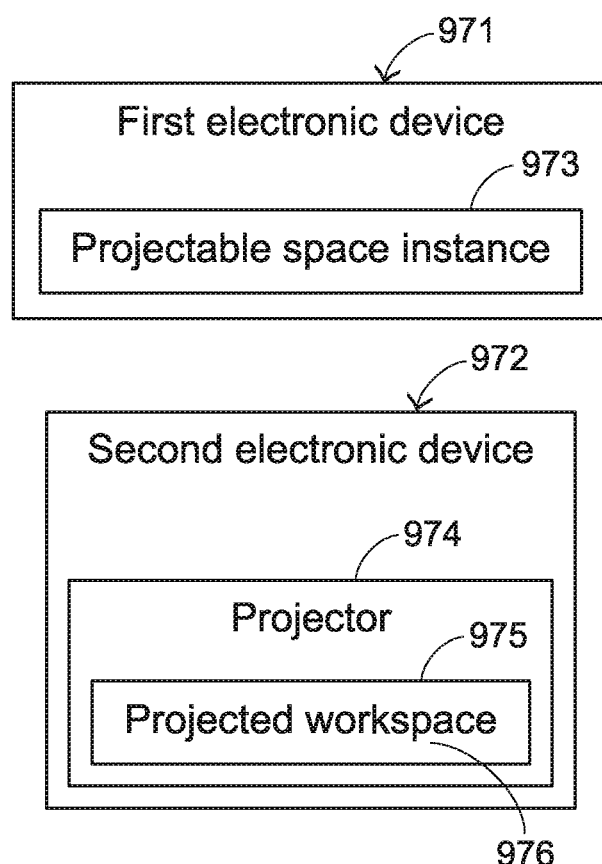
Figure 6:
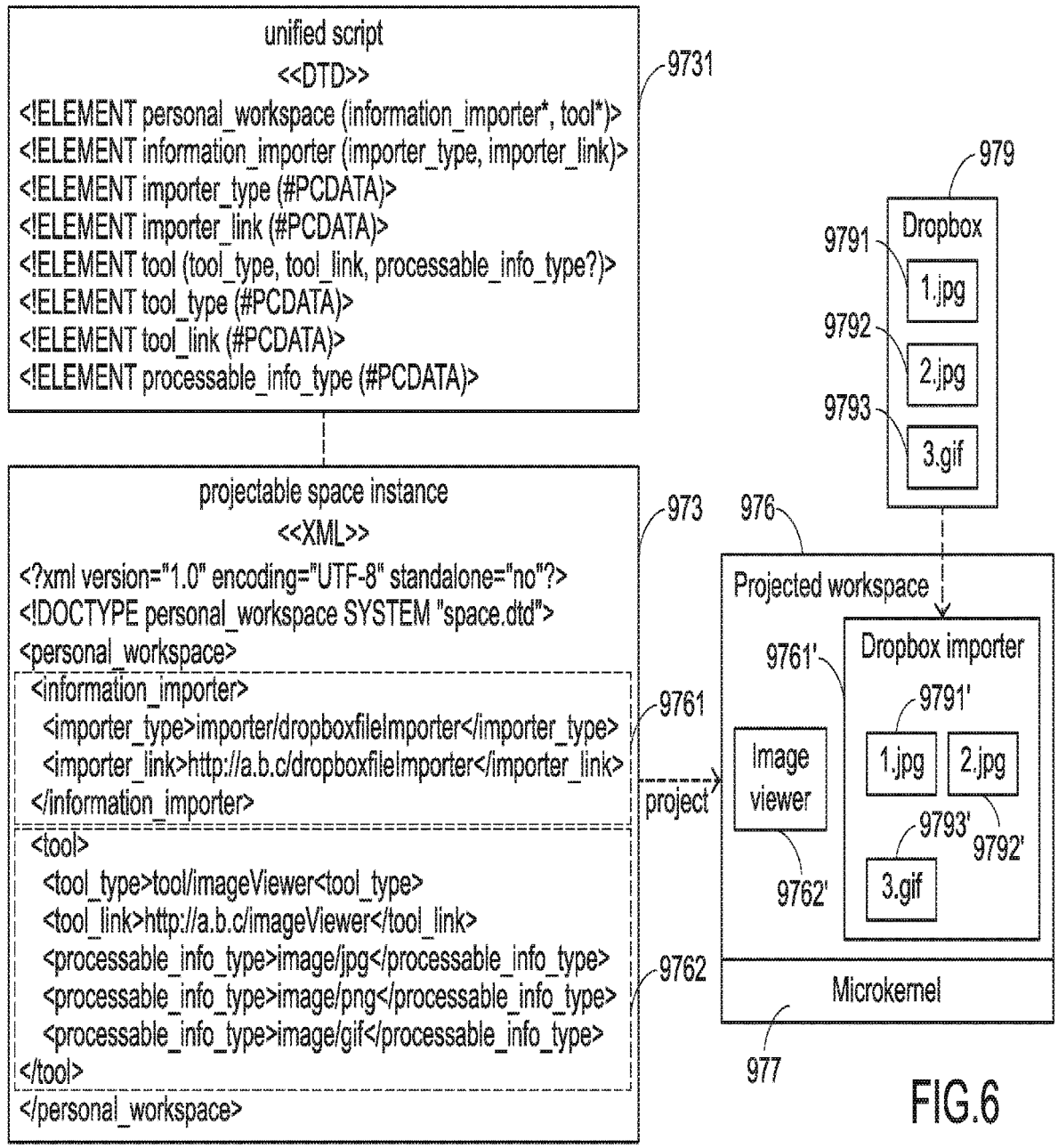
FIG. 6 is a schematic diagram illustrating the relationship between a projectable space instance as shown in FIG. 4 and a projected workspace as shown in FIG. 5B.

Please refer to FIG. 4, FIG. 5A, FIG. 5B and FIG. 6. FIG. 4 is a schematic diagram illustrating an initial state of the method of projecting the workspace according to an embodiment of the present invention. FIGS. 5A and 5B are schematic diagrams illustrating operating concepts of the method of projecting the workspace as shown in FIG. 4. FIG. 6 is a schematic diagram illustrating the relationship between a projectable space instance as shown in FIG. 4 and a projected workspace as shown in FIG. 5B.

In the initial state of FIG. 4, a first electronic device 971 and a second electronic device 972 are in communication with each other (e.g., through network connection). Moreover, the first electronic device 971 stores a projectable space instance 973, and the second electronic device 972 has a built-in projector 974.

In this embodiment, the unified script 9731 is declared by a document type definition (DTD) and defined to configure at least one information importer (i.e., an example of the matterizer), at least one unified information unit and/or at least one unified tool to model a workspace, and the projectable space instance 973 is an instance instantiated with the extensible markup language (XML). As shown in FIG. 6, the projectable space instance 973 is used for building a projected workspace 976 corresponding to the workspace. Moreover, the information importer, the unified information and/or the unified tool is allowed to be added to or removed from the projectable space instance 973.

The projector 974 of the second electronic device 972 will build a working environment 975 in the second electronic device 972 for executing the projected workspace 976. In addition, the projector 974 provides a microkernel 977 (see FIG. 6) to the working environment 975 for equipping at least one information importer, at least one unified information and/or at least one unified tool that will be added to the projected workspace 976. When the second electronic device 972 acquires the projectable space instance 973 from the first electronic device 971 through a URI, the projector 974 of the second electronic device 972 starts to parse the projectable space instance 973 (see FIG. 5A). After the projectable space instance 973 is parsed by the projector 974, the projected workspace 976 is built in the working environment 975 according to parsed contents of the projectable space instance 973 (see FIG. 5B). Accordingly, a user of the second electronic device 972 can interact with the projected workspace 976 through the second electronic device 972 so as to perform related tasks.

The relationships between the unified script 9731, the projectable space instance 973 and the projected workspace 976 will be illustrated in more detailed through a usage situation as shown in FIG. 6. The usage situation as shown in FIG. 6 is related to a process of building a projected workspace that is capable of accessing jpg format image files and gif format image files from a specified internet space and allowing the image files to be viewed by a user. In this usage situation, the unified script 9731 is declared by the Document Type Definition (DTD), and the projectable space instance 973 is instantiated with XML.

Moreover, an information importer and a unified tool are added into the projectable space instance 973, and at least one unified information unit corresponding to the original information is imported into the projected workspace 976 through the information importer. In this usage situation, the information importer is a Dropbox importer. The information of the Dropbox importer is disclosed in the dashed line frame 9761 of FIG. 6. The original information includes a jpg format image file 9791, a jpg format image file 9792 and a gif format image file 9793 in Dropbox 979 (i.e., an information source). The unified information units includes a unified jpg format image file 9791', a unified jpg format image file 9792' and a unified gif format image file 9793', which will be described later. The unified tool is an image viewer for accessing image files which are imported into the projected workspace 976. The information of the image viewer is disclosed in the dashed line frame 9762 of FIG. 6.

As mentioned above, the projected workspace 976 is built after the projectable space instance 973 is parsed by the projector 974 of the second electronic device 972. In this embodiment, the Dropbox importer 9761' corresponding to the dashed line frame 9761 and the image viewer 9762' corresponding to the dashed line frame 9762 are configured in the projected workspace 976. Moreover, the jpg format image file 9791, the jpg format image file 9792 and the gif format image file 9793 in Dropbox 979 are unified and imported into the projected workspace 976 by the Dropbox importer 9761'. Consequently, the unified jpg format image file 9791' corresponding to the jpg format image file 9791, the unified jpg format image file 9792' corresponding to the jpg format image file 9792 and the unified gif format image file 9793' corresponding to the gif format image file 9793 are displayed on the projected workspace 976. When the user of the second electronic device 972 manipulates any of the unified image files 9791', 9792' and 9793' by any specified operating means (such as an action of clicking any of the unified images files 9791', 9792' and 9793' or an action of dragging and dropping any of the image files 9791', 9792' and 9793' to the image viewer 9762'), the image viewer 9762' will access the contents of the corresponding unified image files 9791', 9792' or 9793' to allow the unified image files 9791', 9792' or 9793' to be viewed by the user. Moreover, the Dropbox importer 9761' and the image viewer 9762' mentioned above are equipped by the microkernel 977.

It is noted that the URI of the projectable space instance 973 may be a HTTP (hypertext transfer protocol) URI or a FTP (file transfer protocol) URI. In case that the first electronic device 971 and the second electronic device 972 are integrated into one device, the URI of the projectable space instance 973 can also be a local file URI. However, the types of the URI of the projectable space instance 973 are not restricted.

Herein, "the descriptions of the method of projecting the workspace" may be referred to the U.S. patent application Ser. No. 14/577,772, entitled "Method of projecting a workspace and system using the same", and also referred to the China Patent Application No. 201410814138.5, entitled "Method of projecting a workspace and system using the same". The detailed descriptions thereof are omitted.

The above method of projecting the workspace to any electronic device with computational capability is presented herein for purpose of illustration and description only. The method of projecting the workspace to any electronic device with computational capability is not restricted. However, those skilled in the art will readily observe that numerous modifications and alterations may be made while retaining the teachings of the invention.

A method for constructing an interactive digital catalog to present and manage operable unified matters will be illustrated as follows. The interactive digital catalog is an implementation example of the above "workspace" or "personal workspace". Moreover, the method for constructing the interactive digital catalog and a computer-readable storage medium and an interactive digital catalog using the method can have other implementation examples. It is to be noted that the following descriptions of preferred embodiments of this invention are presented herein for purpose of illustration and description only. The examples below are non-limiting and are merely representative of various aspects and features of the present invention.

Figure 7:
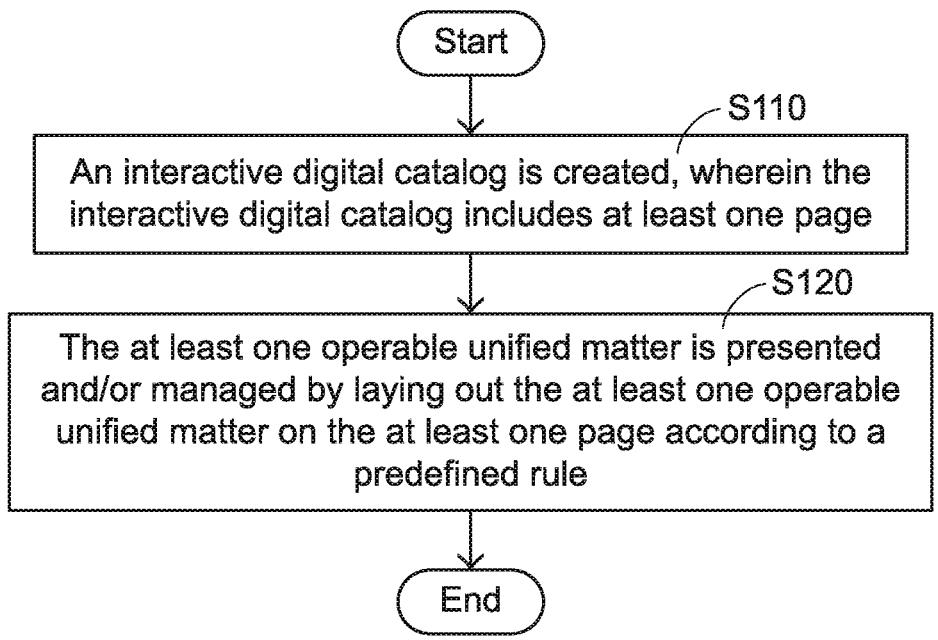
FIG. 7 is a flowchart illustrating a method for constructing an interactive digital catalog according to an embodiment of the present invention.

FIG. 7 is a flowchart illustrating a method for constructing an interactive digital catalog according to an embodiment of the present invention. The method for constructing the interactive digital catalog is used to present and/or manage at least one operable unified matter. The method for constructing the interactive digital catalog comprises the following steps. Firstly, an interactive digital catalog is created, wherein the interactive digital catalog includes at least one page is created (Step S110). Then, the at least one operable unified matter is presented and/or managed by laying out the at least one operable unified matter on the at least one page according to a predefined rule (Step S120).

In an embodiment, the at least one operable unified matter includes at least one unified information unit, at least one unified tool, or a combination thereof. The unified information unit is produced by unifying the at least one original information obtained from at least one information source is unified by an operable unified matter processing system, and the unified tool is produced by unifying the at least one original tool obtained from at least one information source is unified by the operable unified matter processing system.

Figure 8:
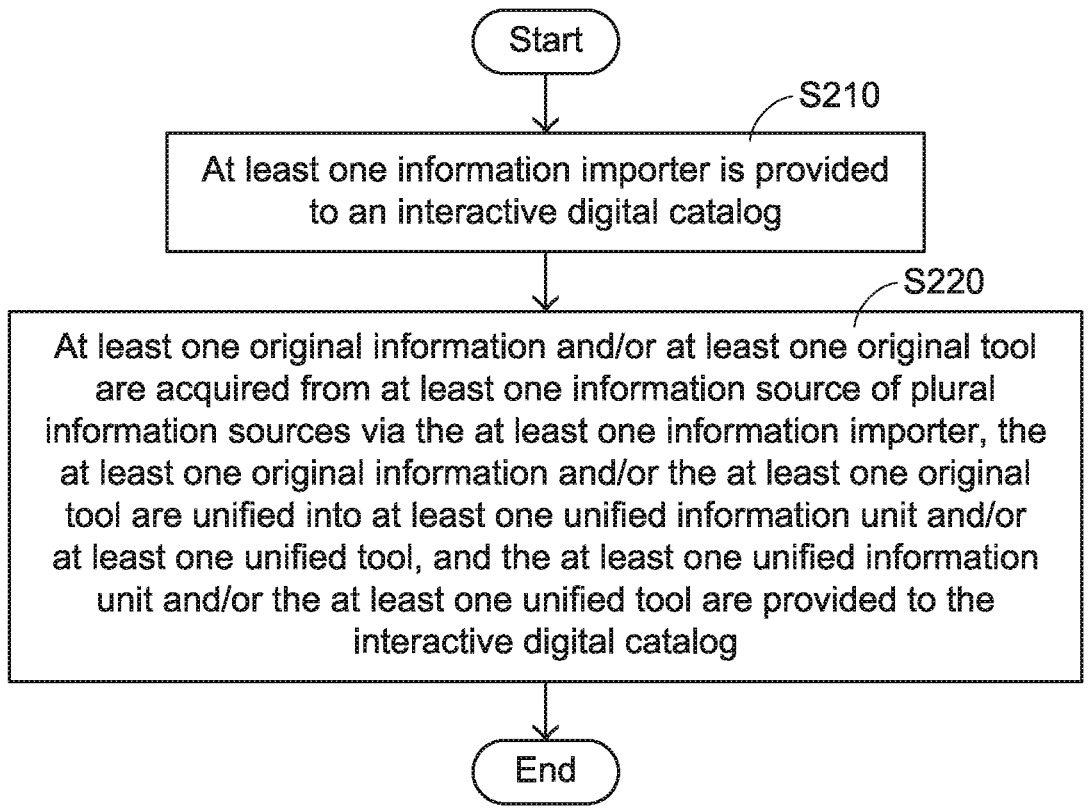
FIG. 8 is a flowchart illustrating a method for generating an operable unified matter according to an embodiment of the present invention.

FIG. 8 is a flowchart illustrating a method for generating an operable unified matter according to an embodiment of the present invention. The method for generating the operable unified matter comprises the following steps. Firstly, at least one information importer is provided to an interactive digital catalog (Step S210). Then, at least one original information and/or at least one original tool are acquired from at least one information source of plural information sources via the at least one information importer, the at least one original information and/or the at least one original tool are unified into at least one unified information unit and/or at least one unified tool, and the at least one unified information unit and/or the at least one unified tool are provided to the interactive digital catalog (Step S220).

First of all, a unified script as an intermediate language for realizing the present invention is edited. The information importers with converting functions of different formations are allowed to be provided to (e.g., built in or plugged in) the unified script. The converting function can convert the original information from different information sources into the unified information units and convert the original tools from different information sources into the unified tools. Preferably but not exclusively, the united script is declared by a document type definition (DTD), an extensible markup language (XML) Schema, a structured language or a structured protocol. The information importer can be implemented as Java Bean, COM, or any kind of pluggable component architecture.

That is, by the method of the present invention, the unified information units and/or the unified tools from identical or different information sources can be collected to the interactive digital catalog. Consequently, the user can use the interactive digital catalog to implement different tasks.

Figure 9:
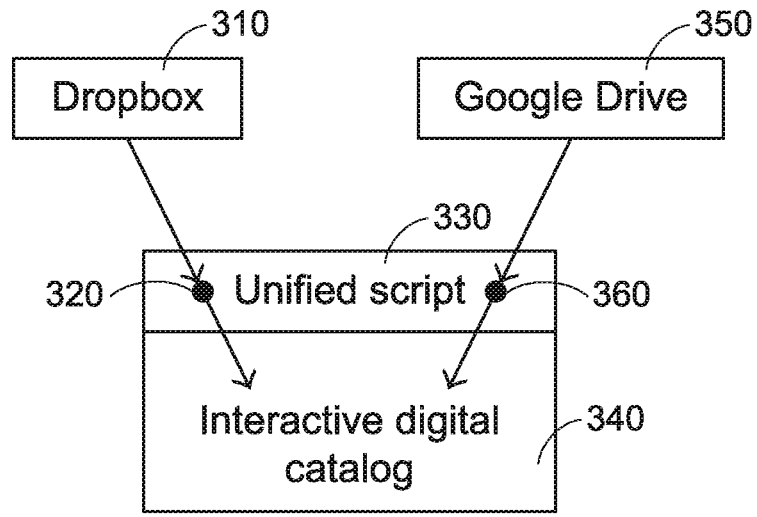
FIG. 9 is a schematic diagram illustrating an implementation concept of providing information importers to the interactive digital catalog in the step S210 of FIG. 8 via a unified script.
Figure 10:
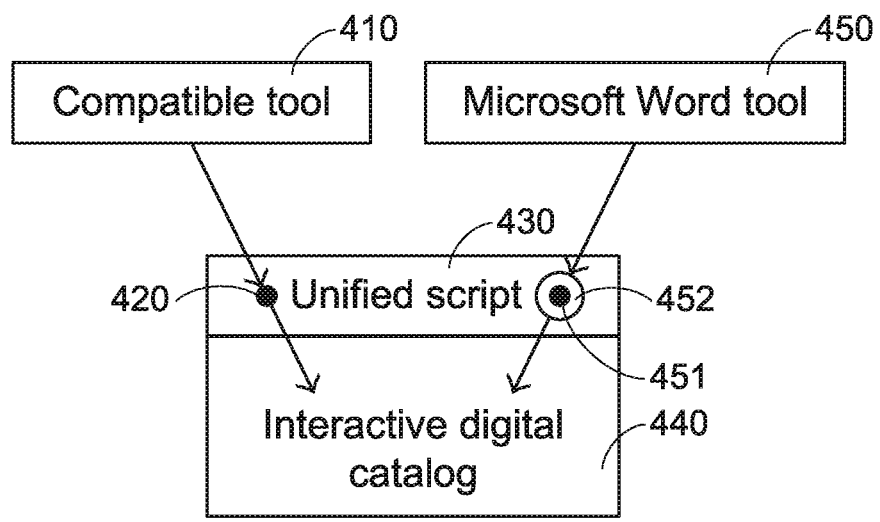
FIG. 10 is a schematic diagram illustrating an implementation concept of allowing the unified tool corresponding to the original tool to be provided to (e.g., built in or plugged in) the interactive digital catalog in the step S220 of FIG. 8.

FIG. 9 is a schematic diagram illustrating an implementation concept of providing information importers to the interactive digital catalog in the step S210 of FIG. 8 via a unified script. As shown in FIG. 9, the unified script 330 is used as an intermediate language in the interactive digital catalog 340. Moreover, the information importer 320 of Dropbox 310 and the information importer 360 of Google Drive 350 are configurable through the unified script 330. After a unifying process, the information importer 320 of Dropbox 310 and the information importer 360 of Google Drive 350 are allowed to enter together into the same interactive digital catalog 340.

As shown in FIG. 9, the information source of the interactive digital catalog 340 is Dropbox 310, and the information importer 320 of Dropbox 310 is a software component capable of unifying the information of Dropbox 310 into the unified information unit. The information importer 320 of Dropbox 310 is configurable through the unified script 330, and may be one of source providers for the interactive digital catalog 340.

Moreover, another information source of the interactive digital catalog 340 is Google Drive 350, and the information importer 360 of Google Drive 350 is a software component capable of unifying the information of Google Drive 350 into the unified information unit. Similarly, the information importer 360 of Google Drive 350 is configurable through the unified script 330, and may be one of source providers for the interactive digital catalog 340.

Moreover, plural unified tools corresponding to plural original tools can be collected to the interactive digital catalog according to different tasks. The original tools are classified into compatible tools and incompatible tools. If the original tool is the compatible tool, the original tool acquired from the at least one information source is directly provided to (e.g., built in or plugged in) the interactive digital catalog via the unified script. Whereas, if the original tool is the incompatible tool, the original tool acquired from the at least one information source is indirectly provided to (e.g., built in or plugged in) the interactive digital catalog via a compatible adapter and the unified script. Moreover, both of the compatible tool and the compatible adapter are regarded as unified tools.

FIG. 10 is a schematic diagram illustrating an implementation concept of allowing the unified tool corresponding to the original tool to be provided to (e.g., built in or plugged in) the interactive digital catalog in the step S220 of FIG. 8. First of all, the condition that the original tool is the compatible tool will be described. As shown in FIG. 10, one original tool is a compatible tool 410 in an information source (e.g., an information importer provided by the supplier). Since the component interface of the compatible tool 410 is compatible with the component architecture for the unified tool in an interactive digital catalog 440, it is presumed that the compatible tool 410 is a compatible unified tool and the compatible tool 410 is able to be directly provided to (e.g., built in or plugged in) the interactive digital catalog 440 via a unified script 430 (i.e., through an information importer 420 therein). Consequently, the specified functions of the compatible tool 410 can be implemented.

Next, the condition that the original tool is the incompatible tool will be described. As shown in FIG. 10, another original tool is a Microsoft Word tool 450 in another information source. Since the component interface of the Microsoft Word tool 450 is incompatible with the component architecture for the unified tool in the interactive digital catalog 440, an adapter 452 compatible with the component architecture for the unified tool in the interactive digital catalog 440 is required. Then, the incompatible Microsoft Word tool 450 is able to be provided to (e.g., built in or plugged in) the interactive digital catalog 440 via the unified script 430 (i.e., through the compatible adapter 452 and/or an information importer 451 therein). Consequently, the specified functions of the Microsoft Word tool 450 can be implemented. As mentioned in FIG. 10, both of the compatible tool and the incompatible tool can be unified into the same interactive digital catalog 440 in order to perform a specified task.

As mentioned above, the compatible tool and the incompatible tool are allowed to enter together into the same interactive digital catalog after the unifying process. Consequently, the interactive digital catalog is equipped with plural unified tools. Moreover, the functional feature provided by each unified tool can display or interpret a specified unified information unit. That is, after the at least one original tool is unified into the unified tool via the unified script, a task can be accomplished by using at least one unified tool to process the corresponding unified information unit.

Moreover, different unified tools can have different functions. Preferably but not exclusively, the unified tool is used for presenting dynamic information, collecting information, manipulating the at least one unified information unit and/or proceeding transactions. Moreover, the operable unified matter is presented with an icon, a text, an input term (a single input item, a multiple input item, a text input term or an event input term), or any combination thereof. For example, in case that the unified tool is a questionnaire tool, the questionnaire interface may have the following configuration. For example, the answer for each question of the questionnaire is a single input item or a multiple input item, the opinion section of the questionnaire is a text input term, and the online submission of the questionnaire is an event input term. That is, after the event input term is accessed, the function of the online submission can be implemented by a computing program or a browser.

Figure 11:
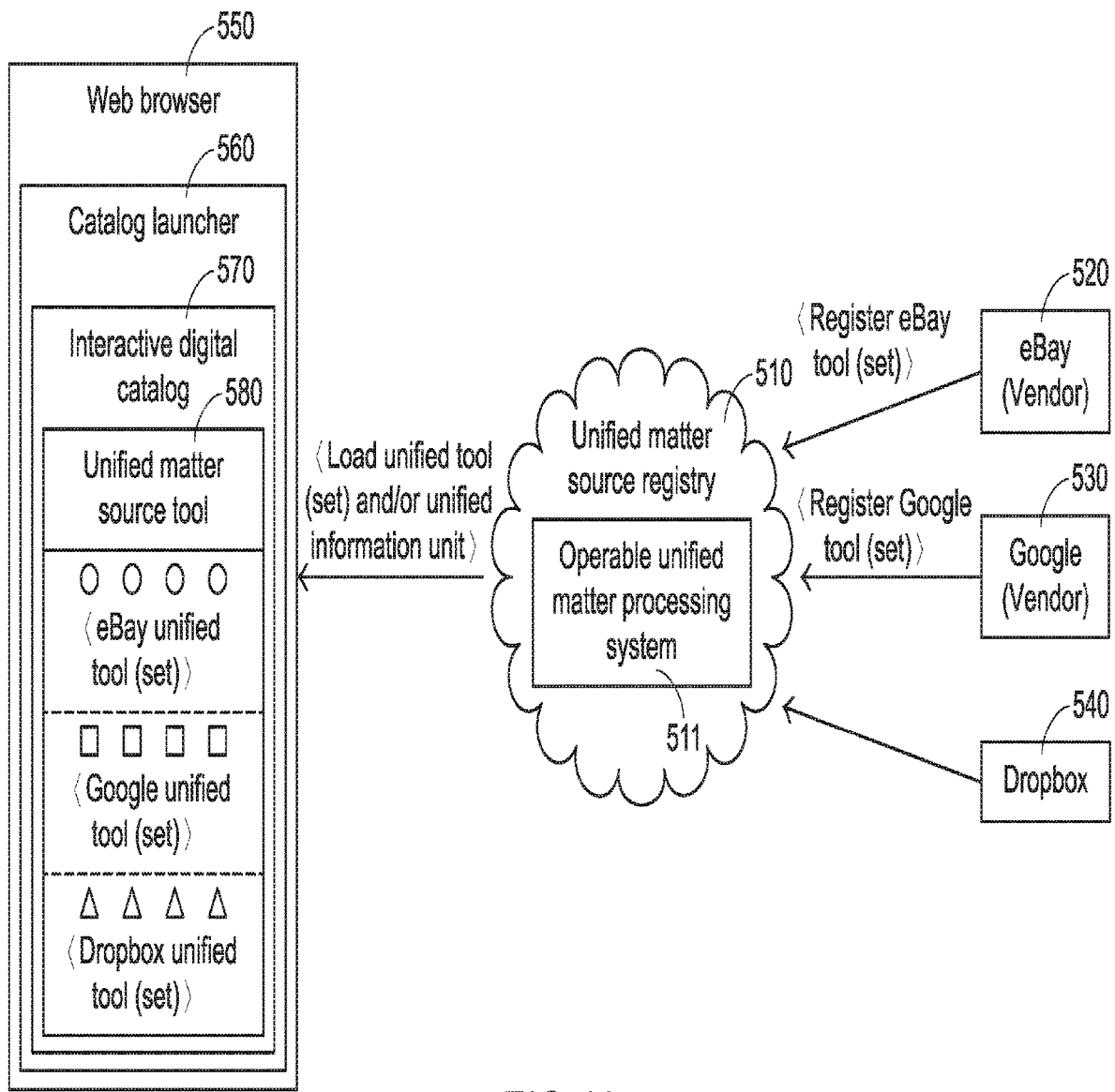
FIG. 11 is a schematic diagram illustrating the source of the operable unified matter of the interactive digital catalog according to an embodiment of the present invention.

FIG. 11 is a schematic diagram illustrating the source of the operable unified matter of the interactive digital catalog according to an embodiment of the present invention. As shown in FIG. 11, a unified matter source registry 510 (e.g., a web server) comprises an operable unified matter processing system 511 for unifying the original information and/or the original tool that are received by the unified matter source registry 510. Moreover, vendors such as eBay 520 and Google 530 can develop various tools or tool sets on the unified matter source registry 510. That is, various tools or tool sets developed by many vendors can be registered to the unified matter source registry 510. In case that the tools or tool sets developed by the vendors have been previously unified into the unified tools or tool sets, the tools or tool sets are considered as compatible tools or tool sets and directly registered to the unified matter source registry 510. In case that the tools or tool sets developed by the vendors contain incompatible tools or tool sets, the tools or tool sets developed by the vendors will be unified into unified tools or tool sets by the operable unified matter processing system 511 of the unified matter source registry 510 via the unified script (not shown). In addition, the original information stored in Dropbox 540 can be configured and unified into unified information units by the operable unified matter processing system 511 and the unified script that are loaded in the unified matter source registry 510.

Moreover, on web browser 550, an interactive digital catalog 570 having a unified matter source tool 580 is launched by a catalog launcher 560. The catalog launcher 560 is an example of the above projector. Moreover, the unified matter source tool 580 is connected with the unified matter source registry 510. The unified matter source tool 580 is able to download the tools or tool sets of eBay 520, the tools or tool sets of Google 530 or the unified information units of Dropbox 540 from the unified matter source registry 510. Consequently, the user can utilize the tools or tool sets of eBay 520 or the tools or tool sets of Google 530 or browse the unified information units of Dropbox 540 on the pages of the interactive digital catalog 570 via the unified matter source tool 580 of the interactive digital catalog 570.

Consequently, if many vendors or developers develop and register various unified tools or tool sets on the unified matter source registry 510, the operable unified matters that can be acquired by the unified matter source tool 580 become diversified. Since the unified matter sources of the operable unified matters are continuously expanded, it is more convenient for the users to acquire various kinds of operable unified tools or tool sets from the unified matter source tool 580 of the interactive digital catalog 570 in order to implement and accomplish various tasks.

The term "browser" used herein includes but is not limited to the application software that displays files in a web server or a file system and allows users to interact with the files. That is, the browser can display texts, images and other information in the World Wide Web or a local area network. The texts, images and other information can be hyperlinked to other websites, thereby enabling the users to browse information easily and quickly.

Figure 12:
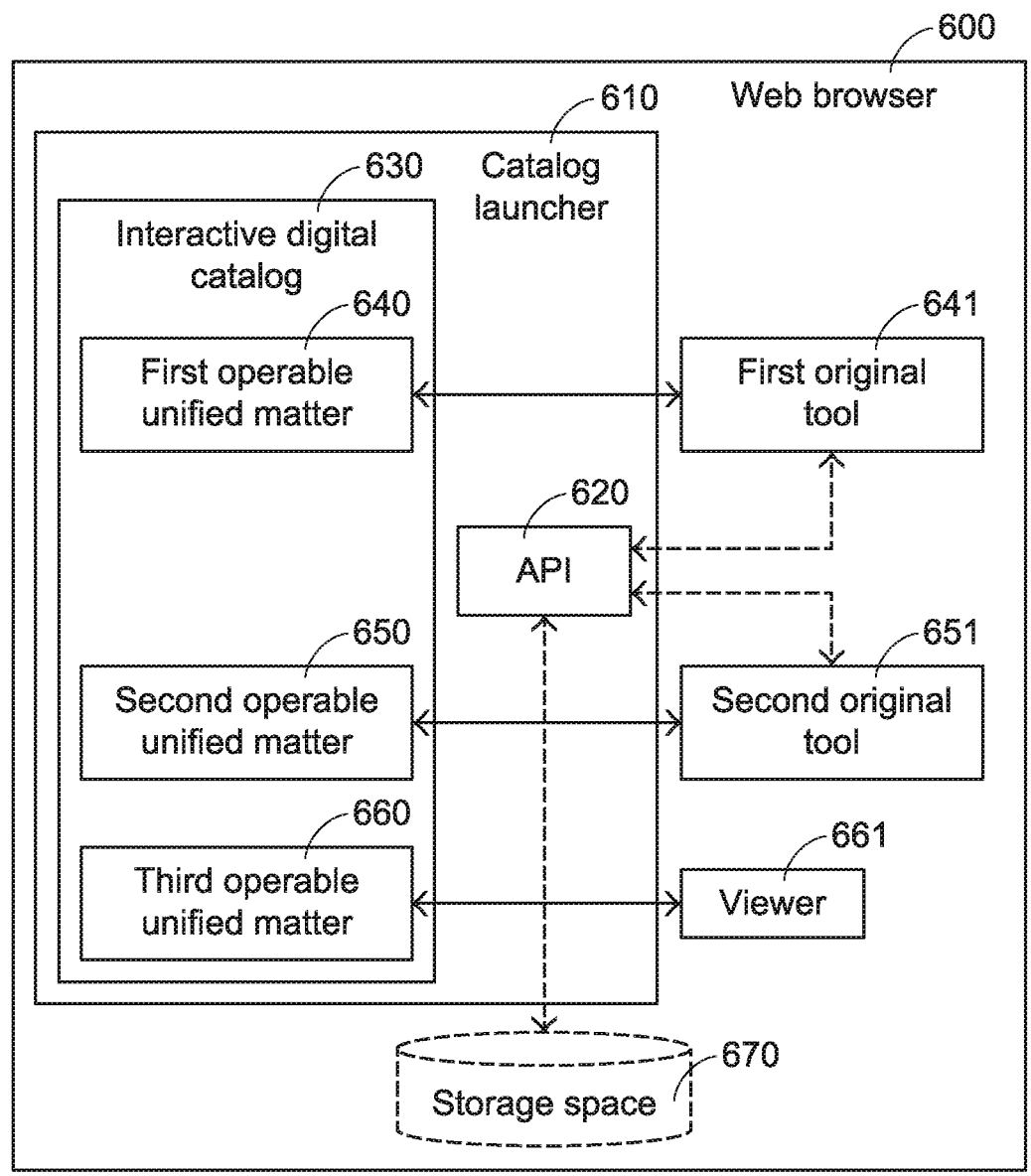
FIG. 12 is a schematic diagram illustrating an implementation concept of presenting and/or managing the operable unified matter in the interactive digital catalog according to an embodiment of the present invention.

FIG. 12 is a schematic diagram illustrating an implementation concept of presenting and/or managing the operable unified matter in the interactive digital catalog according to an embodiment of the present invention. As shown in FIG. 12, a catalog launcher 610 under a web browser 600 launches an application programming interface (API) 620 and an interactive digital catalog 630. The interactive digital catalog 630 contains a first operable unified matter 640, a second operable unified matter 650 and a third operable unified matter 660. The first operable unified matter 640 and the second operable unified matter 650 are unified tools with specific functions. The specified function includes but is not limited to statistics, drawing, word processing, investigation, trading or configuration.

During operation, opening the operable unified matters can launch the corresponding original tools (i.e., executable component) to perform specific functions. For example, the first operable unified matter 640 is a questionnaire file, and the second operable unified matter 650 is a statistical program. After the first operable unified matter 640 is opened by the user, a questionnaire filling-in tool is popped out and shown. The questionnaire filling-in tool is a first original tool 641 corresponding to the first operable unified matter 640. Consequently, the user can input the questionnaire data. In addition, the questionnaire data inputted by the user are written into a storage space 670 of the web browser 600 through the API 620. Moreover, after the second operable unified matter 650 is opened by the user, a statistics tool is launched. The statistics tool is a second original tool 651 corresponding to the second operable unified matter 650. The statistics tool can read the questionnaire data from the storage space 670 through the API 620 and analyze the questionnaire data. In other words, the user can operate the first operable unified matter 640 and the second operable unified matter 650 to active the first original tool 641 and the second original tool 651 so as to complete the task about questionnaire survey and statistics.

Moreover, the API 620 of the catalog launcher 610 allows the operable unified matter to manage or operate other operable unified matters or coordinate with other operable unified matters through an executable component. That is, the API 620 enables plural operable unified matters to interact with each other.

In an embodiment, the content of the operable unified matter only contains information or data (e.g., news content or data report). For example, the third operable unified matter 660 only contains information or data. After the third operable unified matter 660 is opened by the user, a viewer 661 corresponding to the third operable unified matter 660 is launched for allowing the user to browse the information or data of the third operable unified matter 660.

Figure 13:
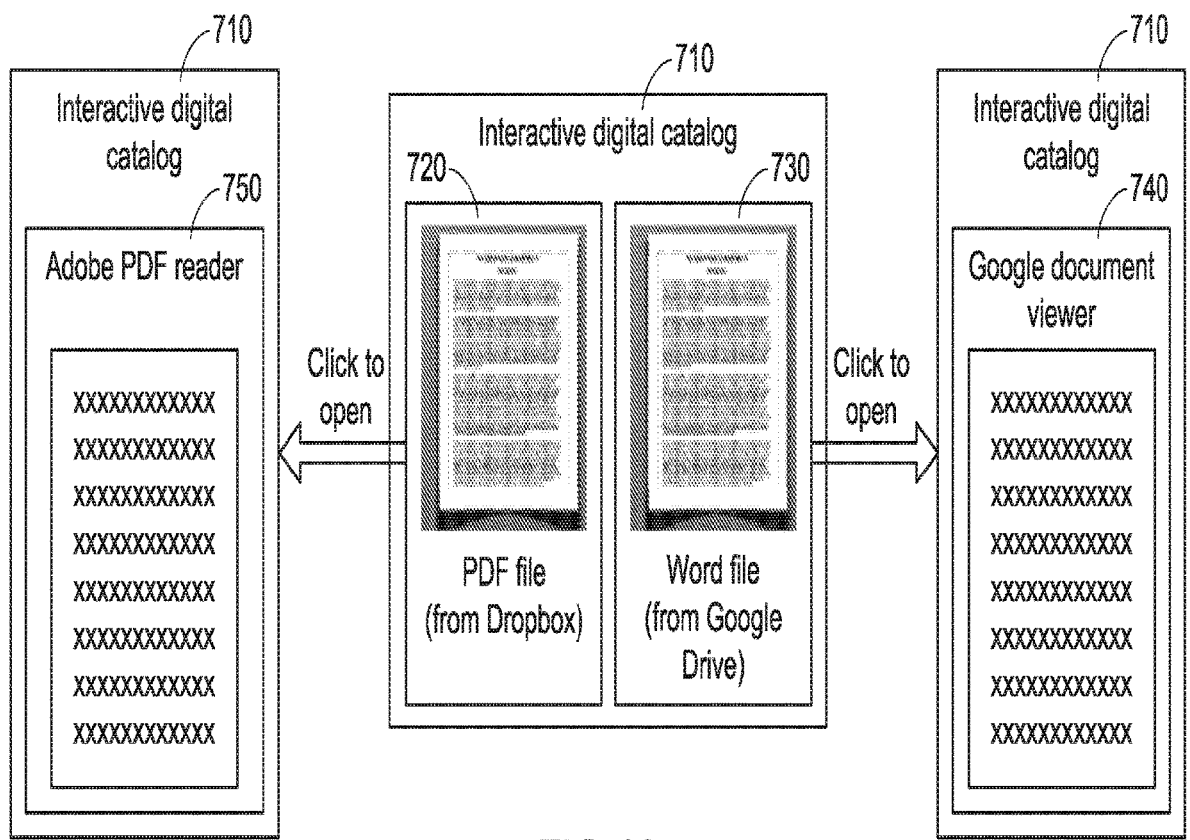
FIG. 13 is a schematic diagram illustrating an implementation concept of accessing or controlling the operable unified matter in the interactive digital catalog according to an embodiment of the present invention.

FIG. 13 is a schematic diagram illustrating an implementation concept of accessing or controlling the operable unified matter in the interactive digital catalog according to an embodiment of the present invention. As shown in FIG. 13, the operable unified matters comprises a PDF file 720 from Dropbox, a Word file 730 from Google Drive, a Google document viewer 740 and an Adobe PDF reader 750. The PDF file 720 from Dropbox and the Word file 730 from Google Drive are both displayed in a page of an interactive digital catalog 710.

In this embodiment, the Google document viewer 740 and the Adobe PDF reader 750 have been previously configured in the interactive digital catalog 710. After the PDF file 720 from Dropbox in the interactive digital catalog 710 is clicked or opened by the user, the corresponding browsing tool (i.e., the Adobe PDF reader 750) is activated. Consequently, the content of the PDF file 72 can be browsed by the user. Similarly, after the Word file 730 from Google Drive is clicked or opened by the user, the corresponding browsing tool (i.e., the Google document viewer 740) is activated. Consequently, the content of the Word file 730 can be browsed by the user.

That is, the user can browse the page on the interactive digital catalog by a clipping action or a dragging action. For example, when the user directly clicks the Word file 730 from Google Drive, the interactive digital catalog 710 searches and selects a suitable unified tool according to the attributes of the clicked document so to display the content of the clicked document. Under this circumstance, the Word file 730 from Google Drive is opened by the Google document viewer 740 so as to be browsed by the user.

Moreover, the operational relationship between the unified tool and the unified information unit of the interactive digital catalog can be established by other means (e.g., the dragging action between the two). After the operational relationship between the unified tool and the unified information unit is established, the user can perform specified tasks by using the unified tool to access or control the corresponding unified information unit. For example, the dragging action for establishing the operational relationship between the unified tool and the unified information unit may have the following two settings. In accordance with a first setting, the unified information unit to be accessed or controlled is dragged and dropped into the corresponding unified tool (with the accessing or controlling function), so that the unified information unit is accessible or controllable. In accordance with a second setting, the unified tool for accessing or controlling the unified information unit is dragged and dropped into the unified information unit to be accessed or controlled, so that the unified information unit is accessible or controllable. Consequently, the user can implement specified tasks more conveniently and efficiently. The way of establishing the operational relationship between the unified tool and the unified information unit is presented herein for purpose of illustration and description only.

Consequently, the unified information unit and the unified tool can be combined together in the interactive digital catalog according to the practical requirements. In such way, the features and functions of the combination of the unified information unit and the unified tool can be executed on the page of the interactive digital catalog.

Figure 14:
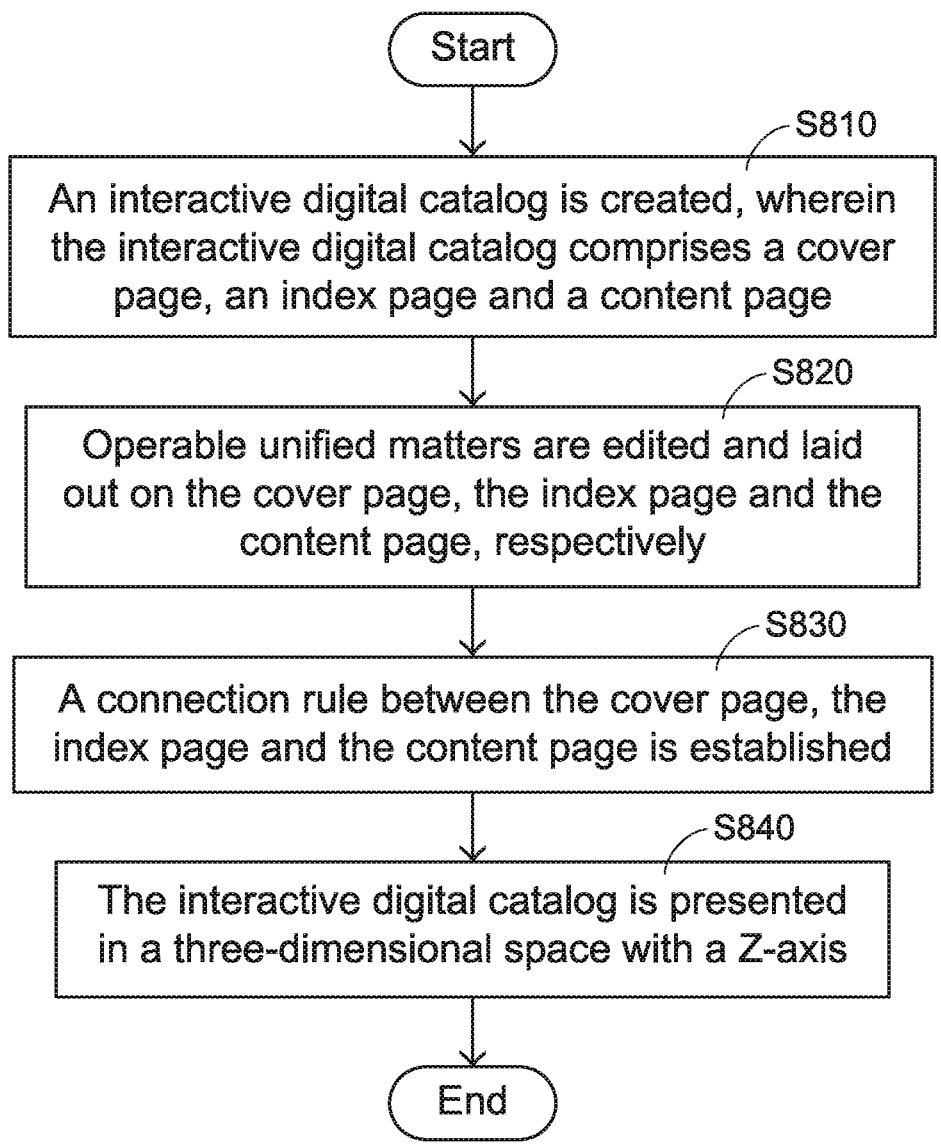
FIG. 14 is a flowchart illustrating a method for establishing the page connection of an interactive digital catalog according to an embodiment of the present invention.

FIG. 14 is a flowchart illustrating a method for establishing the page connection of an interactive digital catalog according to an embodiment of the present invention. The method comprises the following steps. Firstly, an interactive digital catalog is created, wherein the interactive digital catalog comprises a cover page, an index page and a content page (Step S810). Then, operable unified matters are edited and laid out on the cover page, the index page and the content page, respectively (Step S820). Then, a connection rule between the cover page, the index page and the content page is established (Step S830). Afterwards, the interactive digital catalog is presented in a three-dimensional space with a Z-axis (Step S840).

Figure 15:
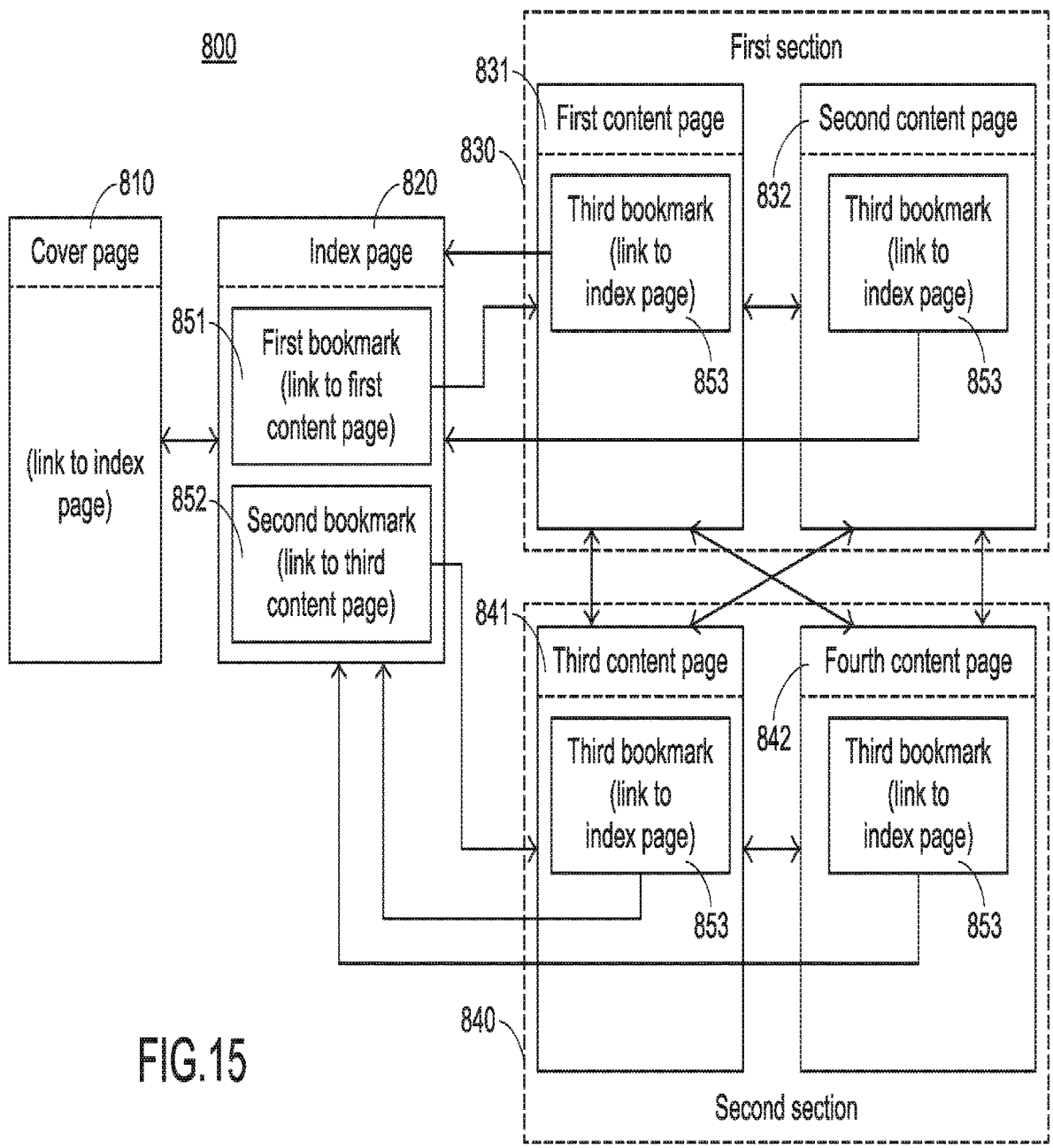
FIG. 15 is a schematic diagram illustrating an implementation concept of establishing the connection rule between the pages in the step S830 of FIG. 14.

FIG. 15 is a schematic diagram illustrating an implementation concept of establishing the connection rule between the pages in the step S830 of FIG. 14. As shown in FIG. 15, a cover page 810, an index page 820, a first content page 831, a second content page 832, a third content page 841 and a fourth content page 842 are firstly created and edited in the interactive digital catalog 800. Then, the connection between the cover page 810 and the index page 820 is established, and a function of switching the page between the cover page 810 and the index page 820 is also provided.

Moreover, bookmarks can be created in the index page 820, and each bookmark can be set to switch to a specified section or a specified content page. As shown in FIG. 15, the first content page 831 and the second content page 832 are grouped into a first section 830, and the third content page 841 and the fourth content page 842 are grouped into a second section 840. A first bookmark 851 and a second bookmark 852 are created in the index page 820. The first bookmark 851 is set to link and open the first content page 831 of the first section 830. The second bookmark 852 is set to link and open the third content page 841 of the second section 840.

Moreover, the connection between any two content pages of the first content page 831, the second content page 832, the third content page 841 and the fourth content page 842 can also be established. Consequently, one of the first content page 831, the second content page 832, the third content page 841 and the fourth content page 842 can be switched to another page. Optionally, a third bookmark 853 is created in any content page for allowing the content page to return to the index page. Consequently, after the page connection of the interactive digital catalog is established, the user can browse all pages of the interactive digital catalog in a manner of flipping books. It is noted that numerous modifications and alterations may be made while retaining the teachings of the invention. For example, in another embodiment, the interactive digital catalog 800 does not contain the cover page 810, and the index page 820 is directly used as the cover.

Figure 16:
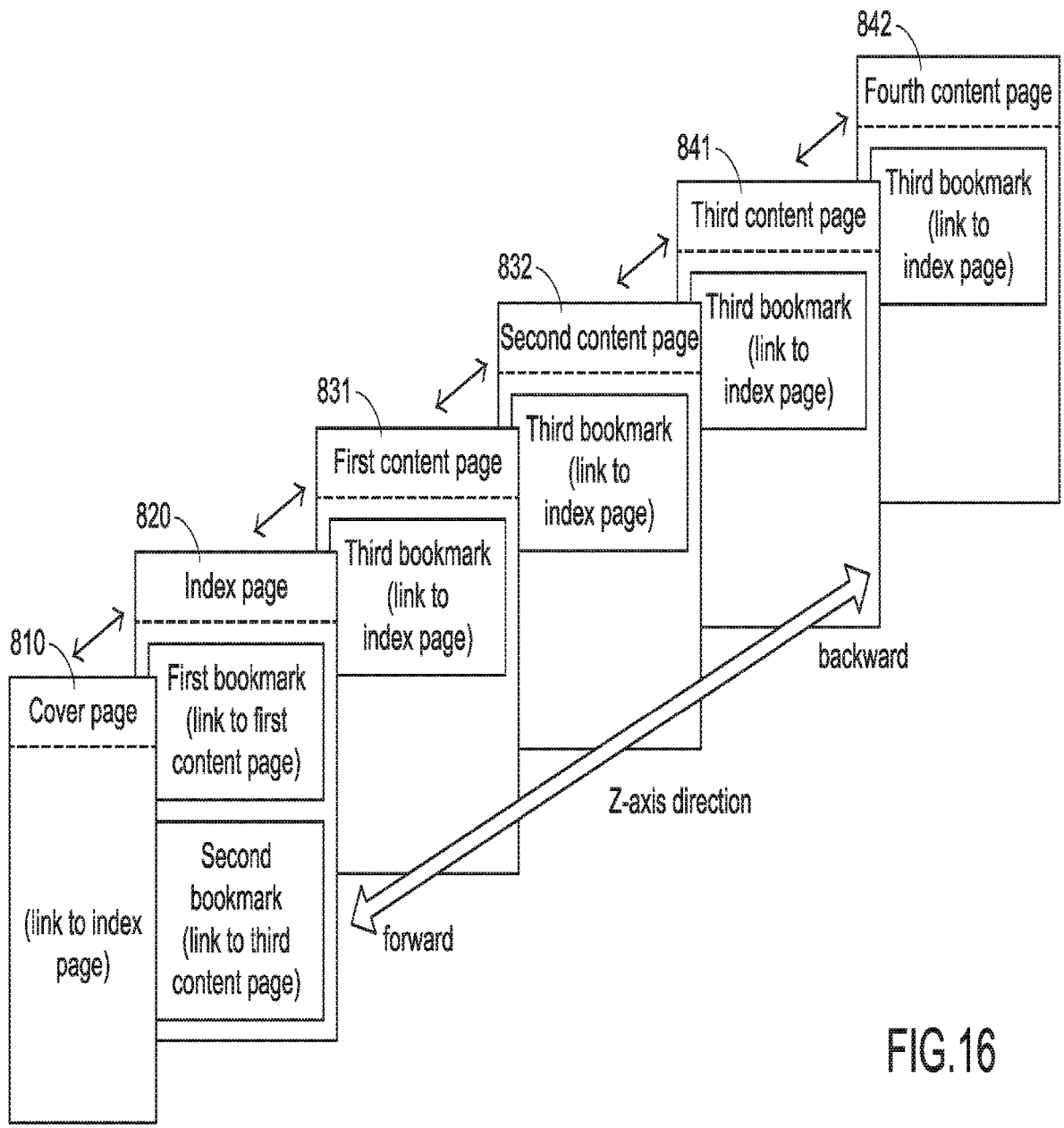
FIG. 16 is a schematic diagram illustrating an implementation concept of presenting the interactive digital catalog of FIG. 15 in a three-dimensional space according to an embodiment of the present invention.

FIG. 16 is a schematic diagram illustrating an implementation concept of presenting the interactive digital catalog of FIG. 15 in a three-dimensional space according to an embodiment of the present invention. In a three-dimensional space, plural pages of the interactive digital catalog 800 are arranged along the Z-axis (e.g., the orientation direction). In the initial state, the plural pages are sequentially the cover page 810, the index page 820 and several content pages 831, 832, 841 and 842. In addition, the fourth content page 842 is at the bottom of the z-axis, and the cover page 810 is at the top of the Z-axis. The way of arranging plural pages along the Z-axis is well known to those skilled in the art, and is not redundantly described herein. In this context, the arrangement of the plural pages along the Z-axis can be used to adjust the visual appearance of one page or plural pages. Preferably but not exclusively, the visual appearance to be adjusted includes the page size, the page shape or the page border between at least two pages or surrounding pages.

Moreover, in the interactive digital catalog 800 of FIG. 16, the index page 820 and the content pages 831, 832, 841 and 842 are not at the top of the Z-axis, but sequentially arranged long the Z-axis. Moreover, these pages are partially overlapped with each other, or the next page along the Z-axis is sheltered by the previous page. Moreover, since the cover page 810 is at the top of the Z axis, the cover page 810 is not sheltered by any other page. When the user browses the interactive digital catalog 800, the cover page 810 is the concerned top page.

Moreover, the user can input a command to move any page of the interactive digital catalog 800 to the top of the Z-axis. That is, each page of the interactive digital catalog is moved in response to the command. Consequently, the cover page 810 is moved from the top of the Z-axis to the last page of the interactive digital catalog or visually disappears. Other pages, e.g., the index page 820 and the content pages 831, 832, 841 and 842, are moved forward to the front positions of previous pages. Meanwhile, the index page 820 is moved toward to the top of the Z-axis and became the concerned top page.

Figure 17:
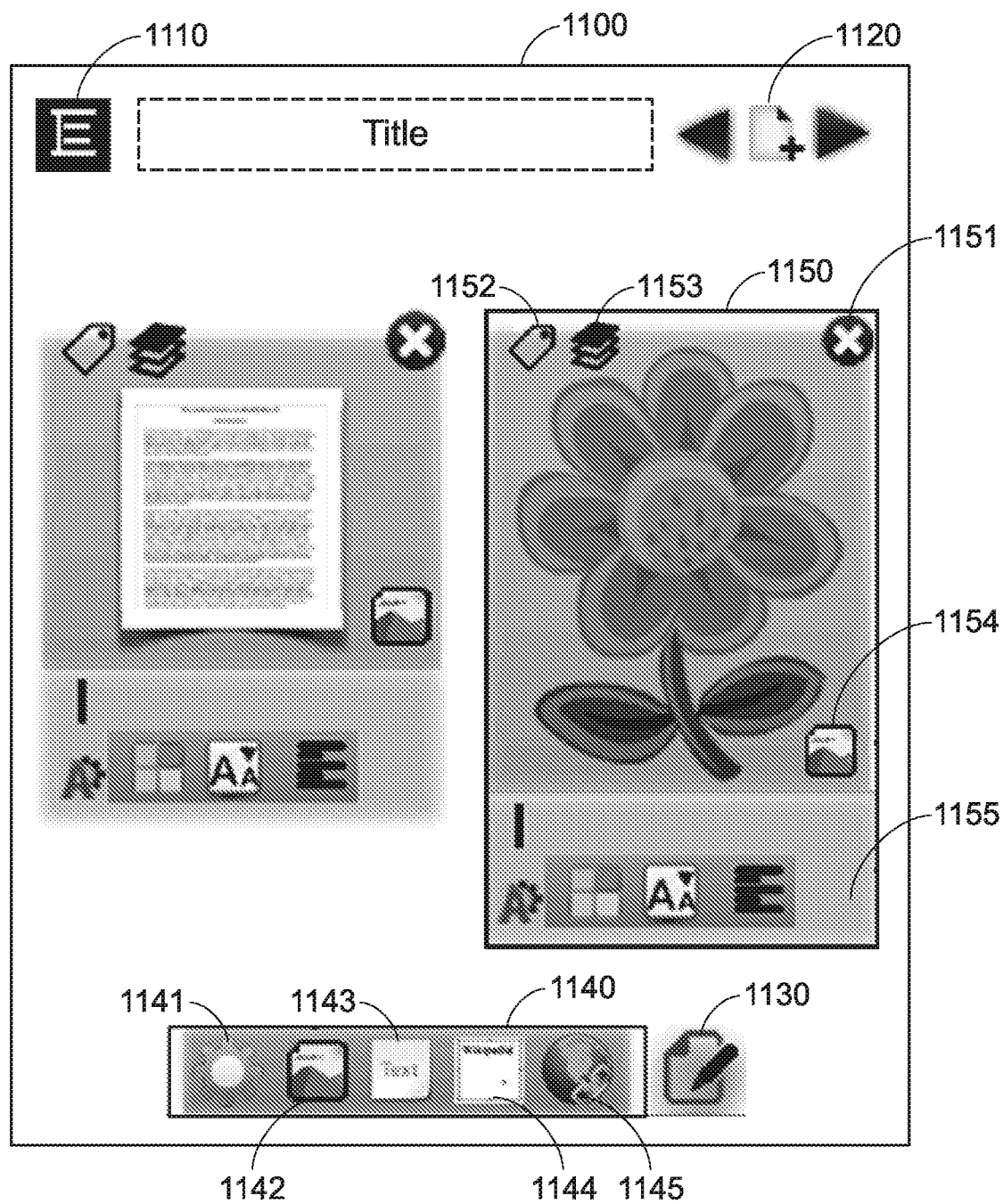
FIG. 17 is a schematic diagram illustrating an implementation concept of editing and laying out the operable unified matters on the interactive digital catalog in the step S820 of FIG. 14.

Visually, the movement of the pages of the interactive digital catalog 800 (e.g., the cover page 810, the index page 820 and the content pages 831, 832, 841 and 842) is similar to flow-in toward the user. The moving speed of these pages can be controlled by the user. For example, the moving speed of these pages can be controlled with a mouse (not shown) or according to a setting provided by the interactive digital catalog 800. In FIG. 17, the interactive digital catalog interactive digital catalog is presented in the three-dimensional space. In some other embodiments, the interactive digital catalog interactive digital catalog is presented in a two-dimensional space or a four-dimensional space. Moreover, the user can directly open the designated page through the bookmarks of the index page 820 and the content pages 831, 832, 841 and 842 (e.g., the first bookmark 851, the second bookmark 852 or the third bookmark 853). Consequently, the designated page is moved toward to the top of the Z-axis and became the concerned top page.

Preferably but not limited, the operable unified matter is laid out on any page of the interactive digital catalog according to a predefined rule. The predefined rule is used to scale the at least one operable unified matter, move the at least one operable unified matter, and/or apply a template to the at least one operable unified matter. In an embodiment, the predefined rule is implemented by an editing component. The editing component provides editing tools for editing the operable unified matters on the pages of the interactive digital catalog.

FIG. 17 is a schematic diagram illustrating an implementation concept of editing and laying out the operable unified matters on the interactive digital catalog in the step S820 of FIG. 14. As shown in FIG. 17, a content page 1100 comprises a bookmark 1110 which is used to return to the index page, a page-adding button 1120 and an editing-mode button 1130. During operation, the user may send a request to the unified matter source registry through the unified matter source tool (not shown) so as to acquire the required unified matters.

Moreover, by clicking the editing-mode button 1130 of the content page 1100, a browsing mode is switched an editing mode, or the editing mode is switched to the browsing mode. In editing mode, the editing-mode button 1130 is able to present a tool list 1140. The tool list 1140 contains many tools, wherein each tool is a unified matter with a specific function. For example, the tools in the tool list 1140 comprise a setting tool 1141, an image file tool 1142, a text file tool 1143, a PDF file publishing tool 1144 and a web linking tool 1145. For example, the image file tool 1142 is used to insert an image (e.g., a flower image) into the content page 1100, and the text file tool 1143 is used to insert a text file into the content page 1100.

While the object (e.g., the flower image or the text file) is added to the content page 1100, an editing interface 1150 for implementing the predefined rule is also generated. In this embodiment, the editing interface 1150 comprises a deleting tool 1151, a hashtagging tool 1152, a z-axis sequence adjusting tool 1153, an image adjusting tool 1154 and a text box 1155. The deleting tool 1151 is used for deleting the object. The hashtagging tool 1152 is used for tagging the object. The z-axis sequence adjusting tool 1153 is used for adjusting the position of the object along the z-axis. The image adjusting tool 1154 is for adjusting the image of the object. The text box 1155 is used for inputting and adjusting the text content. After the editing operation on the content page 1100 is completed and the editing mode is switched to the browsing mode through the editing-mode button 1130, the tools provided in the editing mode will be hidden. That is, only the objects that are inserted during the editing process are left to be browsed by the user.

Figure 18:
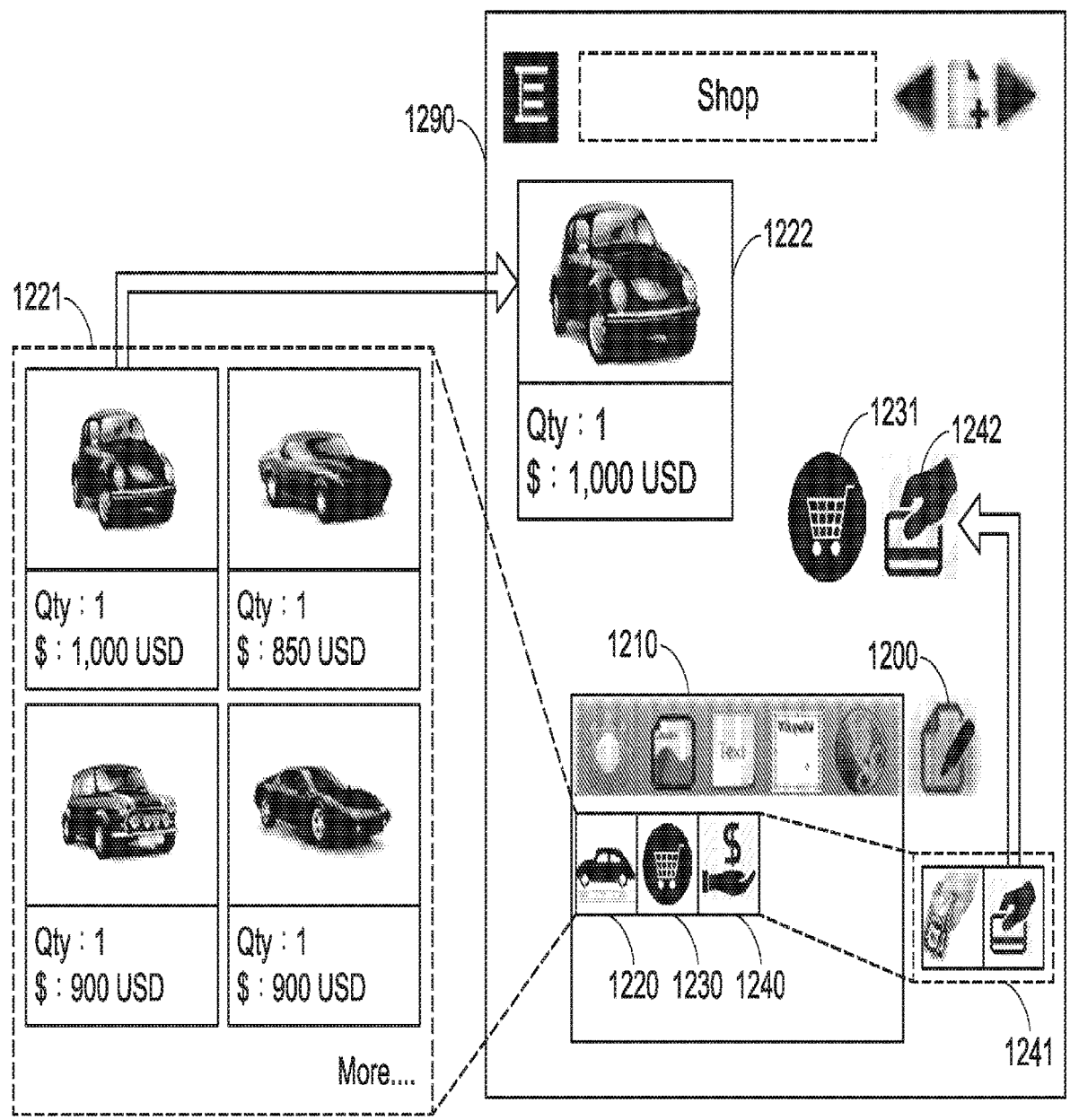
FIG. 18 is a schematic diagram illustrating an implementation concept of editing a shopping page on the interactive digital catalog by the method of FIG. 14.

FIG. 18 is a schematic diagram illustrating an implementation concept of editing a shopping page on the interactive digital catalog by the method of FIG. 14. In this embodiment, a content page 1290 also has an editing-mode button 1200. Through the editing-mode button 1200, the content page 1290 enters the editing mode. In the editing mode, the editing-mode button 1200 is able to present a tool list 1210. The tool list 1210 contains a car sale list tool 1220, a shopping-cart tool 1230 and a payment tool 1240.

As mentioned above, the original tool corresponding to the car sale list tool 1220, the original tool corresponding to the shopping-cart tool 1230 and the original tool corresponding to the payment tool 1240 can be designed and provided by an e-commerce website vendor (e.g., eBay). Moreover, these tools can be uploaded and registered to the unified matter source registry by the e-commerce website vendor. After these tools are authenticated and unified by the unified matter source registry, these tools are connected to a unified matter source tool (i.e., the tool list 1210). Consequently, the car sale list tool 1220, the shopping-cart tool 1230 and the payment tool 1240 are presented in the tool list 1210. Please refer to FIG. 18 again. When the car sale list tool 1220 is clicked, a pop-up selling window 1221 is presented. The pop-up selling window 1221 displays various cars and their preset selling conditions such as quantities and prices. The shopping-cart tool 1230 is used for recording and displaying the purchased items and the price to be paid. The payment tool 1240 is used for providing a payment option (e.g. cash or credit card).

While the user edits the interactive digital catalog, the car sale list tool 1220 presents the pop-up selling window 1221. The models, quantities and prices of plural objects are displayed in the pop-up selling window 1221. A user can directly drag an object 1222 of a particular car model to the content page 1290, then drags a tool 1231 having the function of a shopping cart from the shopping-cart tool 1230, and finally selects the credit card payment tool 1242 from a cash/credit card payment tool window 1241 of the payment tool 1240 and places the credit card payment tool 124 on the content page 1290. Consequently, a shopping page is constructed.

It is noted that the objects or the tools are all activated. That is, the content page 1290 has a built-in application program interface that can automatically search operable unified matters corresponding to any operable unified matter (e.g., any object or any tool) of the content page 1290 and establish the linking relationship between these matters. Consequently, the interaction between these matters is permitted. When any consumer wants to purchase a car through the above shopping page (i.e., the content page 1290), the consumer can firstly select the object 1222 of the particular car model and input the quantity to be purchased. Then, the consumer confirms the purchased items and the total price to be paid by using the tool 1231 having the function of a shopping cart. After the consumer inputs the password of the credit card to complete the payment through the credit card payment tool 1242, the process of purchasing the car is completed.

Consequently, by providing various tools and editing pages, the user can easily and conveniently design and construct an interactive digital catalog having the shopping function. Upon completion, the interactive digital catalog can be uploaded to a web server or displayed on a window or a browser so as to be browsed and operated by other users.

Figure 19A:
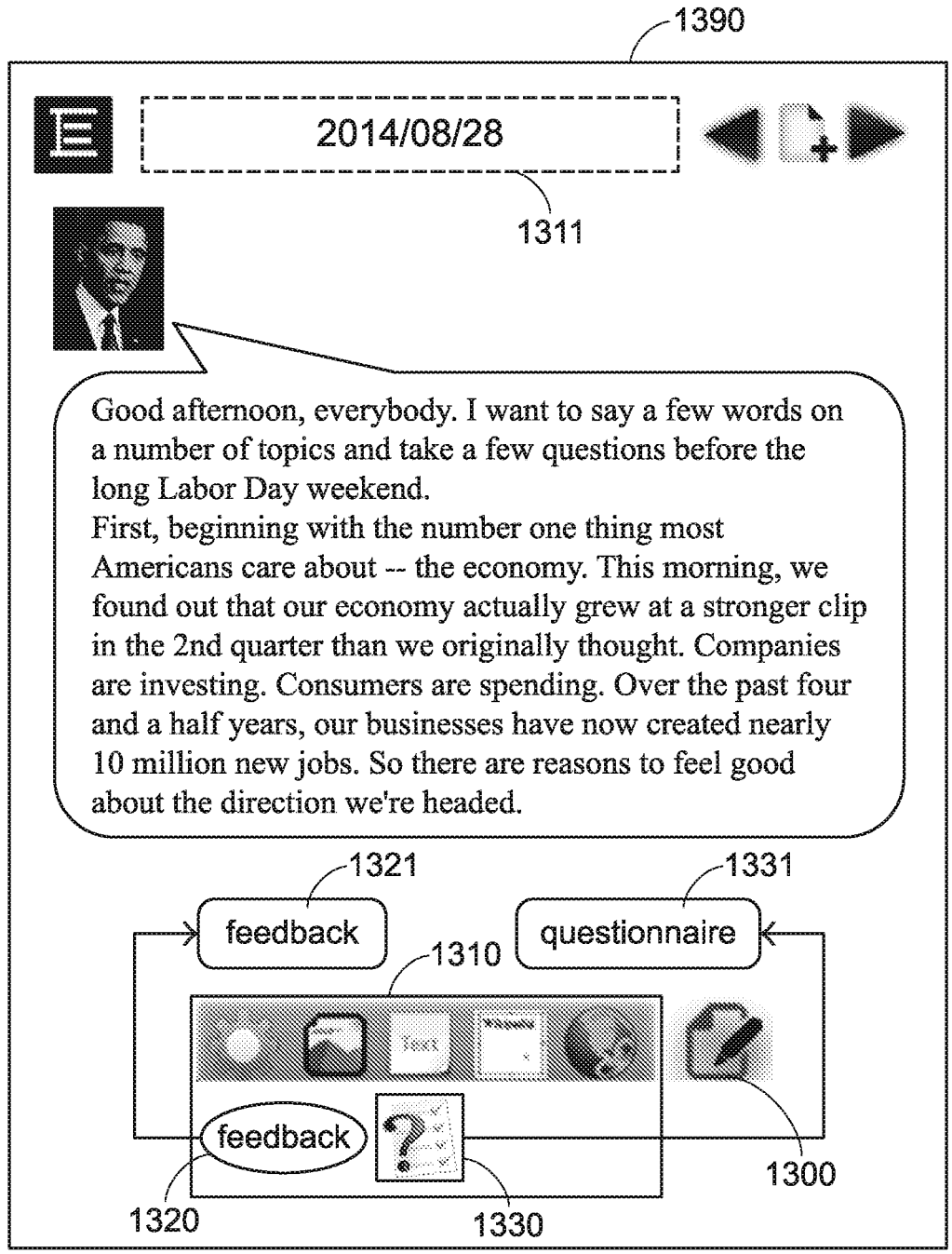
FIG. 19A is a schematic diagram illustrating an implementation concept of using the interactive digital catalog to publish news and collect opinion feedbacks according to an embodiment of the present invention.
Figure 19B:
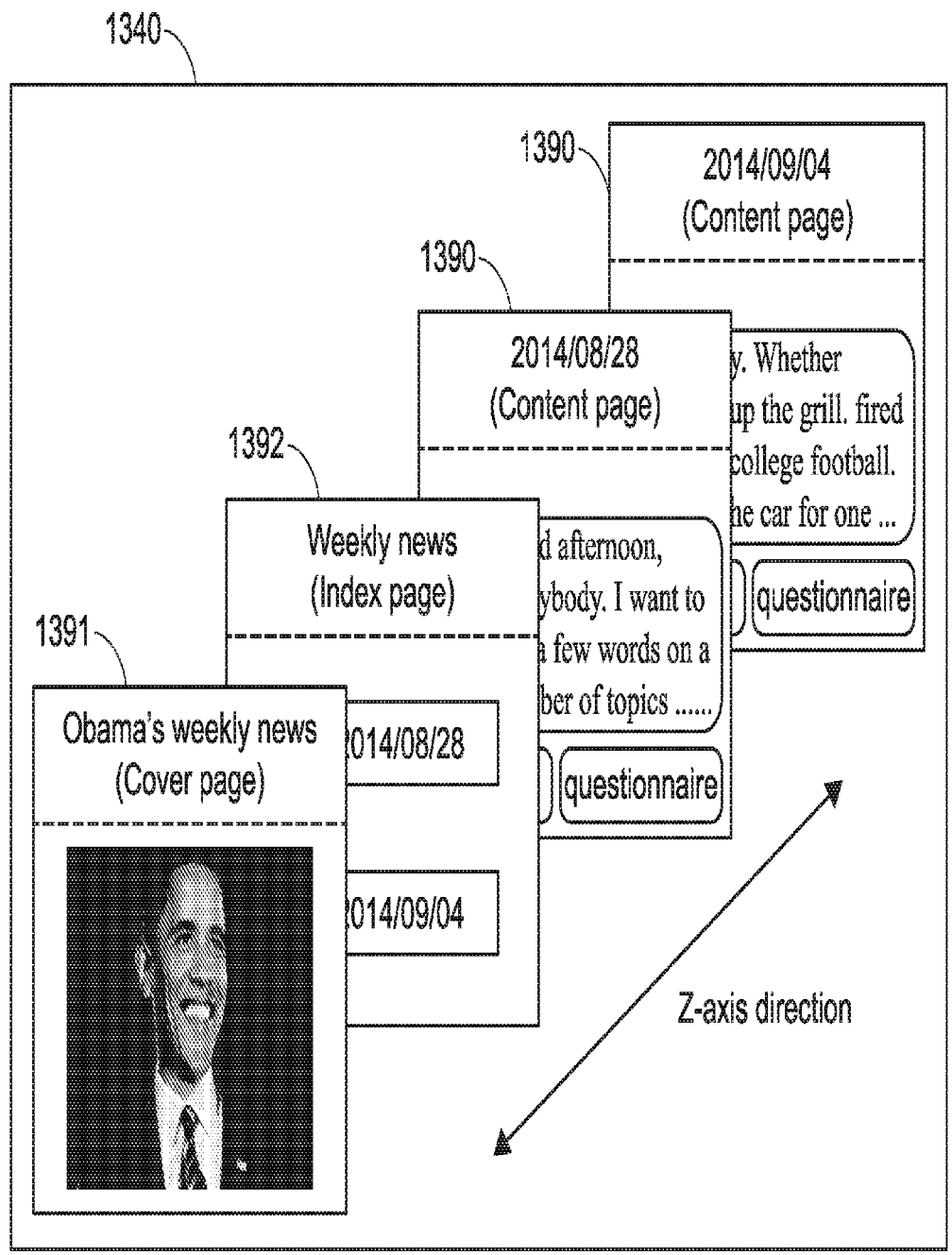
FIG. 19B is a schematic diagram illustrating an implementation concept of presenting the interactive digital catalog of FIG. 19A in a three-dimensional space.

Please refer to FIGS. 19A and 19B. FIG. 19A is a schematic diagram illustrating an implementation concept of using the interactive digital catalog to publish news and collect opinion feedbacks according to an embodiment of the present invention. FIG. 19B is a schematic diagram illustrating an implementation concept of presenting the interactive digital catalog of FIG. 19A in a three-dimensional space. In this embodiment, the purpose of the interactive digital catalog 1350 is to publish weekly news about the American president Barack Obama, to collect feedbacks and to answer questionnaires. Please refer to FIG. 19A. In the editing mode, the user can input the published date of the news into a title region 1311 of a content page 1390, and insert the text file of the news and an image of Obama by using the a tool list 1310 under an editing-mode button 1300. Moreover, the editing-mode button 1300 further provides a feedback tool 1320 and a questionnaire tool 1330 to enable the user to add a feedback button 1321 and a questionnaire button 1331 to the content page 1390. According to the above procedures, the user can compile plural content pages easily and manage and collect the weekly news about Obama.

After the content page 1390 is compiled by the user, a cover page and an index page of the weekly news were can be further designed, and connections between all pages are also established in order to switch pages between each other.

Moreover, a bookmark is also included in the page for opening the designated page. As shown in FIG. 19B, bookmarks with publishing dates (e.g., "2014/08/28" and "2014/09/04") are created in the index page 1392. When one of the bookmarks is pressed or clicked, the content page containing the news published on the particular date is opened. In this context, the tem "opening the designated page" used herein indicates that the designated page is moved to the top of the Z-axis and becomes the concerned top page. After shown in FIG. 19B, the interactive digital catalog 1350 regarding Obama's weekly news comprises the cover page 1391, the index page 1392 and several content pages 1390. Moreover, the interactive digital catalog 1350 is placed in a workspace 1340 and presented in the three-dimensional space. The pages of the interactive digital catalog 1350 (e.g., the cover page 1391, the index page 1392 and the content pages 1390) are partially overlapped with each other and sequentially arranged long the Z-axis. Consequently, the user can browse the interactive digital catalog 1350 by moving the pages (e.g., the cover page 1391, the index page 1392 and the content pages 1390) forwardly or backwardly along the Z-axis direction.

Figure 19C:
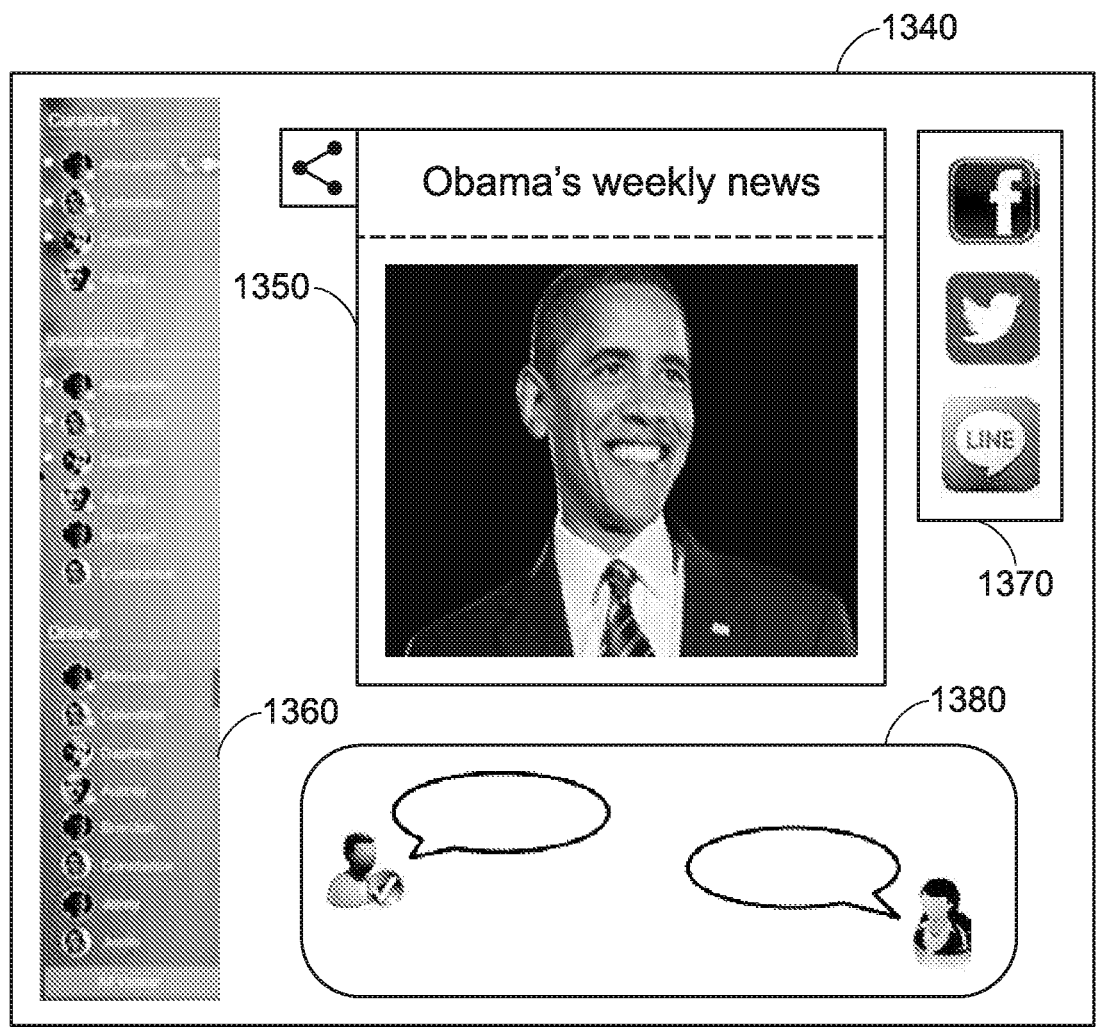
FIG. 19C is a schematic diagram illustrating an implementation concept of placing the interactive digital catalog of FIG. 19A in a workspace.

FIG. 19C is a schematic diagram illustrating an implementation concept of placing the interactive digital catalog of FIG. 19A in a workspace. As shown in FIG. 19C, the workspace 1340 for accommodating the interactive digital catalog 1350 further comprises a contact list 1360 and a social website link area 1370. Through the contact list 1360 or the social websites of a social website link area 1370 (e.g., Facebook, Twitter or Line), the user can share or publish the interactive digital catalog 1350 to at least one contact person or at least one social website. Consequently, other users receiving the interactive digital catalog 1350 can browse the contents of the interactive digital catalog 1350. Moreover, when the feedback button 1321 and/or the questionnaire button 1331 in the interactive digital catalog 1350 are clicked by the user, an opinion-filling window and/or a questionnaire window are popped up. Through the opinion-filling window and/or a questionnaire window, the user can fill the feedback opinion and answer the questionnaire. Consequently, the user who originally publishes the interactive digital catalog 1350 can collect the feedback opinion and the questionnaire in order for the subsequent analysis and assessment.

Moreover, the first user who originally shares or publishes the interactive digital catalog can set the authorities of controlling the interactive digital catalog (e.g., the authorities of editing, sharing, or uploading the content of the interactive digital catalog). Consequently, first user who originally shares or publishes the interactive digital catalog can update the content of the interactive digital catalog about Obama's weekly news. Alternatively, the first user can set the editing authorities of allowing other users with the interactive digital catalog 1350 to cooperatively work.

In this embodiment, the workspace 1340 further comprises a chatroom 1380 for allowing users to communicate with each other through texts and/or video communication. Through the chatroom 1380, the users can discuss the content of the interactive digital catalog or directly capture or drag the content of the interactive digital catalog to the chatroom 1380.

Figure 20:
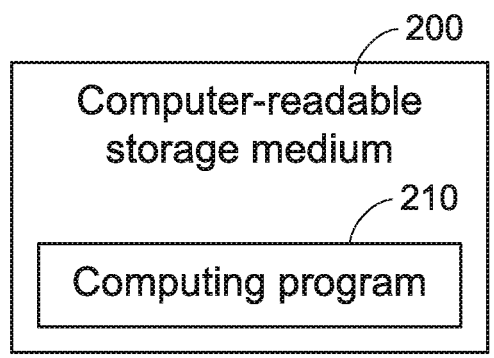
FIG. 20 is a schematic block diagram illustrating a computer-readable storage medium according to an embodiment of the present invention.

FIG. 20 is a schematic block diagram illustrating a computer-readable storage medium according to an embodiment of the present invention. The computer-readable storage medium 200 is used for constructing an interactive digital catalog to present and/or manage at least one operable unified matter. The computer-readable storage medium 200 includes a computing program 210. While the computing program 210 is executed, the computing program 201 performs the following steps. Firstly, an interactive digital catalog including at least one page is created (Step S110). Then, the at least one operable unified matter is presented and/or managed by laying out the at least one operable unified matter on the at least one page according to a predefined rule (Step S120). The implementations of the steps S110 and S120 are similar to those mentioned above, and the detailed descriptions thereof are omitted.

In particular, the computing program 210 store in the computer-readable storage medium 200 can be implemented in a computing device, and the interactive digital catalog is presented in a graphical user interface (GUI) of the computing device. An example of the computing device includes but is not limited to a server, a computer (e.g., a desktop computer, a notebook computer or a tablet computer), a portable electronic device (e.g., a smart phone or a personal digital assistant), a wearable electronic device (e.g., a smart watch, a smart wristband or smart glasses) or any other internet accessible device. In an embodiment, the computing device and/or the computer-readable storage medium 200 are owned by the internet service provider. Consequently, the computing device and/or the computer-readable storage medium 200 can provide a network service of constructing the interactive digital catalog.

From the above descriptions, the present invention provides a method for constructing an interactive digital catalog with operable unified matters. When compared with the conventional technologies, the present invention has the following advantages.

Firstly, when various unified matters are developed by a growing number of vendors or developers according to the standards or formats of the unified matters, the information sources of the operable unified matters in the interactive digital catalog will be continuously expanded. Since the required unified matters can be acquired more easily and conveniently, the users can operate the interactive digital catalog to implement tasks.

Secondly, the conventional digital catalogs or their programs are created or developed by vendors or developers, and the contents of the conventional digital catalogs are passively accepted by people or users and barely allowed to be adjusted under some particular limitations and restrictions. However, the users of the interactive digital catalog of the present invention can edit, lay out, use and combine any unified matters on each page of the interactive digital catalog according to the personal needs. In other words, the interactive digital catalog provides high flexibility of allowing the users to acquire and lay out the required unified matter on the interactive digital catalog without limitations or restrictions. Consequently, users can design personalized or customized interactive digital catalogs. For example, according to the concepts of the present invention, users can design interactive digital catalogs about personal websites, commercial websites, biographies, educations or introductions.

Thirdly, plural unified matters that are laid out and combined together on the interactive digital catalog can interact with each other through an application programming interface (API) launched by an analog launcher. That is, when one unified mattered is executed or operated, the API searches and opens another corresponding unified matter, so that both unified matters cooperatively implement a task.

Fourthly, the interactive digital catalog is a coordinating platform. In case that many users are authorized to edit the interactive digital catalog, these users can edit a unified matter or coordinate with each other to complete the interactive digital catalog concurrently or at any time. For example, for compiling a catalog about Obama's life, users can firstly collect data about Obama's life at different stages. After plural content pages are edited and managed according to the data collected by the users, the plural content pages are integrated into a complete interactive digital catalog. In addition, the interactive digital catalog can be shared with or transmitted to other people or social websites in a wired or wireless transmission manner.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of operating a digital workspace in a working environment, the method comprising:
launching the digital workspace through a launcher and presenting the digital workspace in the working environment, wherein the digital workspace is projected in the working environment through the launcher, wherein the digital workspace contains at least one operable unified matter modeled from at least one original matter located in at least one information source different from the working environment, and wherein the at least one operable unified matter includes at least one unified information unit and/or at least one unified tool, and the at least one original matter includes at least one original information and/or at least one original tool; and
in response to a user action to open an unified tool of the at least one unified tool presented in the digital workspace, launching a corresponding original tool of the at least one original tool connected with the unified tool of the at least one unified tool through the launcher, and/or in response to a user action to open an unified information unit of the at least one unified information unit presented in the digital workspace, launching a corresponding viewer of the unified information unit of the at least one unified information unit to browse content of the unified information unit of the at least one unified information unit, wherein the content of the unified information unit of the at least one unified information unit and the corresponding viewer of the unified information unit of the at least one unified information unit come from different information sources.

2. The method according to claim 1, wherein the digital workspace includes at least one content page, and wherein the at least one operable unified matter is contained in the at least one content page of the digital workspace.

3. The method according to claim 1, wherein the at least one unified tool is used for presenting dynamic information, collecting information, manipulating the at least one unified information unit, and/or proceeding transactions.

4. The method according to claim 1, wherein the at least one unified information unit and/or the at least one unified tool is imported to the digital workspace through an information importer.

5. The method according to claim 1, wherein the at least one operable unified matter is presented in the digital workspace with an icon, a text, an input term, or any combination thereof.

6. The method according to claim 1, wherein the at least one operable unified matter is laid out and presented in the digital workspace according to a predefined rule.

7. The method according to claim 6, wherein the predefined rule is used to scale the at least one operable unified matter, move the at least one operable unified matter, and/or apply a template to the at least one operable unified matter so as to change a layout of the at least one operable unified matter in the digital workspace.

8. The method according to claim 1, wherein an application programming interface is provided to the digital workspace to interact with the at least one operable unified matter.

9. The method according to claim 8, wherein the application programming interface allows a first one of the at least one operable unified matter to manage and/or operate a second one of the at least one operable unified matter, or allows the first one of the at least one operable unified matter and the second one of the at least one operable unified matter to cooperate with each other.

10. The method according to claim 9, wherein when the at least one operable unified matter is operated, at least one executable component connected with the at least one operable unified matter is inserted into the digital workspace through the launcher, so that a specified task is performed.

11. The method according to claim 10, wherein the at least one executable component is built in or plugged in the digital workspace.

12. The method according to claim 1, wherein the working environment is a workspace accommodating the digital workspace, and wherein the digital workspace is placed and presented in the workspace.

13. A system for operating a digital workspace in a working environment, the system comprising a processing unit and a non-transitory storage medium having program code stored therein that, in response to execution by the processing unit, causes the system to at least:
launch the digital workspace through a launcher and present the digital workspace in the working environment, wherein the digital workspace is projected in the working environment through the launcher, wherein the digital workspace contains at least one operable unified matter modeled from at least one original matter located in at least one information source different from the working environment, and wherein the at least one operable unified matter includes at least one unified information unit and/or at least one unified tool, and the at least one original matter includes at least one original information and/or at least one original tool; and
in response to a user action to open an unified tool of the at least one unified tool presented in the digital workspace, launch a corresponding original tool of the at least one original tool connected with the unified tool of the at least one unified tool through the launcher, and/or in response to a user action to open an unified information unit of the at least one unified information unit presented in the digital workspace, launch a corresponding viewer of the unified information unit of the at least one unified information unit to browse content of the unified information unit of the at least one unified information unit, wherein the content of the unified information unit of the at least one unified information unit and the corresponding viewer of the unified information unit of the at least one unified information unit come from different information sources.

14. The system according to claim 13, wherein the digital workspace includes at least one content page, and wherein the at least one operable unified matter is contained in the at least one content page of the digital workspace.

15. The system according to claim 13, wherein the at least one unified tool is used for presenting dynamic information, collecting information, manipulating the at least one unified information unit, and/or proceeding transactions.

16. The system according to claim 13, wherein the at least one unified information unit and/or the at least one unified tool is imported to the digital workspace through an information importer.

17. The system according to claim 13, wherein the at least one operable unified matter is presented in the digital workspace with an icon, a text, an input term, or any combination thereof.

18. The system according to claim 13, wherein the at least one operable unified matter is laid out and presented in the digital workspace according to a predefined rule.

19. The system according to claim 18, wherein the predefined rule is used to scale the at least one operable unified matter, move the at least one operable unified matter, and/or apply a template to the at least one operable unified matter so as to change a layout of the at least one operable unified matter in the digital workspace.

20. The system according to claim 13, wherein an application programming interface is provided to the digital workspace to interact with the at least one operable unified matter.

21. The system according to claim 20, wherein the application programming interface allows a first one of the at least one operable unified matter to manage and/or operate a second one of the at least one operable unified matter, or allows the first one of the at least one operable unified matter and the second one of the at least one operable unified matter to cooperate with each other.

22. The system according to claim 21, wherein when the at least one operable unified matter is operated, at least one executable component connected with the at least one operable unified matter is inserted into the digital workspace through the launcher, so that a specified task is performed.

23. The system according to claim 22, wherein the at least one executable component is built in or plugged in the digital workspace.

24. The system according to claim 13, wherein the working environment is a workspace accommodating the digital workspace, and wherein the digital workspace is placed and presented in the workspace.

25. A non-transitory storage medium for operating a digital workspace in a working environment, the non-transitory storage medium having program code stored therein that, in response to execution by a processing unit, causes a system to at least:
launch the digital workspace through a launcher and present the digital workspace in the working environment, wherein the digital workspace is projected in the working environment through the launcher, wherein the digital workspace contains at least one operable unified matter modeled from at least one original matter located in at least one information source different from the working environment, and wherein the at least one operable unified matter includes at least one unified information unit and/or at least one unified tool, and the at least one original matter includes at least one original information and/or at least one original tool; and
in response to a user action to open an unified tool of the at least one unified tool presented in the digital workspace, launch a corresponding original tool of the at least one original tool connected with the unified tool of the at least one unified tool through the launcher, and/or in response to a user action to open an unified information unit of the at least one unified information unit presented in the digital workspace, launch a corresponding viewer of the unified information unit of the at least one unified information unit to browse content of the unified information unit of the at least one unified information unit, wherein the content of the unified information unit of the at least one unified information unit and the corresponding viewer of the unified information unit of the at least one unified information unit come from different information sources.

26. The non-transitory storage medium according to claim 25, wherein the digital workspace includes at least one content page, and wherein the at least one operable unified matter is contained in the at least one content page of the digital workspace.

27. The non-transitory storage medium according to claim 25, wherein the at least one unified tool is used for presenting dynamic information, collecting information, manipulating the at least one unified information unit, and/or proceeding transactions.

28. The non-transitory storage medium according to claim 25, wherein the at least one unified information unit and/or the at least one unified tool is imported to the digital workspace through an information importer.

29. The non-transitory storage medium according to claim 25, wherein the at least one operable unified matter is presented in the digital workspace with an icon, a text, an input term, or any combination thereof.

30. The non-transitory storage medium according to claim 25, wherein the at least one operable unified matter is laid out and presented in the digital workspace according to a predefined rule.

31. The non-transitory storage medium according to claim 30, wherein the predefined rule is used to scale the at least one operable unified matter, move the at least one operable unified matter, and/or apply a template to the at least one operable unified matter so as to change a layout of the at least one operable unified matter in the digital workspace.

32. The non-transitory storage medium according to claim 25, wherein an application programming interface is provided to the digital workspace to interact with the at least one operable unified matter.

33. The non-transitory storage medium according to claim 32, wherein the application programming interface allows a first one of the at least one operable unified matter to manage and/or operate a second one of the at least one operable unified matter, or allows the first one of the at least one operable unified matter and the second one of the at least one operable unified matter to cooperate with each other.

34. The non-transitory storage medium according to claim 33, wherein when the at least one operable unified matter is operated, at least one executable component connected with the at least one operable unified matter is inserted into the digital workspace through the launcher, so that a specified task is performed.

35. The non-transitory storage medium according to claim 34, wherein the at least one executable component is built in or plugged in the digital workspace.

36. The non-transitory storage medium according to claim 25, wherein the working environment is a workspace accommodating the digital workspace, and wherein the digital workspace is placed and presented in the workspace.

* * * * *